United States Patent
Nakajima et al.

(10) Patent No.: US 11,573,975 B2
(45) Date of Patent: Feb. 7, 2023

(54) DATA MIGRATION METHOD, DATA MIGRATION SYSTEM, AND NODE

(71) Applicant: HITACHI, LTD., Tokyo (JP)

(72) Inventors: Jun Nakajima, Tokyo (JP); Yoji Ozawa, Tokyo (JP); Takayuki Nagai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 84 days.

(21) Appl. No.: 17/185,350

(22) Filed: Feb. 25, 2021

(65) Prior Publication Data
US 2022/0050852 A1 Feb. 17, 2022

(30) Foreign Application Priority Data
Aug. 11, 2020 (JP) .............................. JP2020-135623

(51) Int. Cl.
| G06F 15/16 | (2006.01) |
| G06F 16/25 | (2019.01) |
| G06F 16/27 | (2019.01) |
| H04L 67/1095 | (2022.01) |

(52) U.S. Cl.
CPC ............ G06F 16/254 (2019.01); G06F 16/27 (2019.01); H04L 67/1095 (2013.01)

(58) Field of Classification Search
None
See application file for complete search history.

(56) References Cited

U.S. PATENT DOCUMENTS

| 10,860,259 | B1 * | 12/2020 | Winarski | ............... G06F 3/0608 |
| 2017/0187693 | A1 * | 6/2017 | Chandramouli | ........ H04L 63/20 |
| 2017/0364552 | A1 * | 12/2017 | Pattanaik | ............ G06F 16/2255 |
| 2018/0323963 | A1 * | 11/2018 | Stollman | ................. G06F 16/86 |
| 2019/0370223 | A1 * | 12/2019 | Yang | ..................... G06F 3/0647 |
| 2020/0042996 | A1 * | 2/2020 | Mayblum | ............ G06Q 20/065 |

FOREIGN PATENT DOCUMENTS

JP 2005-208757 A 8/2005

OTHER PUBLICATIONS

"A Blockchain Platform for the Enterprise" Hyperledger Fabric, Internet <URL: http://hyperledger-fabric.readthedocs.io/en/latest/> [online], [searched on May 7, 2020], 2 pgs.

* cited by examiner

Primary Examiner — Alex Gofman
(74) Attorney, Agent, or Firm — Volpe Koenig

(57) ABSTRACT

A data migration system 10 includes: a management server 20 configured to obtain transaction information from a distributed ledger at a data migration source, and transmit a migration transaction to a distributed ledger node at a data migration destination, the migration transaction specifying a transaction ID indicated by the transaction information obtained; and the distributed ledger node 100 configured to receive the migration transaction, obtain transaction information in the distributed ledger at the data migration source based on the transaction ID, extract data on a predetermined processing result from the transaction information obtained, execute a transaction using the extracted data as an argument, and transmit a result of the executed transaction to a transaction distribution node 300 at the data migration destination.

9 Claims, 18 Drawing Sheets

MIGRATION PROGRAM TABLE 26

| ORGANIZATION ID | INFORMATION FOR ACCESSING OTHER MIGRATION PROGRAMS |
|---|---|
| Org1 | http://ikousmacon.org1.co.jp/ |
| Org2 | http://org2.co.jp/service/blockchainaccess/ |

FIG. 10

MIGRATION VALIDATION RESULT SCREEN — 1200

| VALIDATION TASK NAME | VALIDATION STATUS | START TIME | END TIME |
|---|---|---|---|
| verifyA | SUCCEEDED | 2020-04-02 11:21:33 | 2020-04-02 13:42:03 |
| verification1 | IN PROGRESS | 2020-04-02 11:21:33 | - |

1210

VALIDATION RESULT DETAILS: verifyA — 1220

| MIGRATION SOURCE | | | ⇒ | MIGRATION DESTINATION | | |
|---|---|---|---|---|---|---|
| BLOCK NO. | TRANSACTION NO. | TRANSACTION ID | | BLOCK NO. | TRANSACTION NO. | TRANSACTION ID |
| #4 | #1 | dfsafafa3213242344 | OK | #4 | #1 | dfsafafa3213242344 |
| #4 | #2 | 239ruewilfmalrwlr | OK | #5 | #1 | 239ruewilfmalrwlr |

FIG. 18

DATA MIGRATION METHOD, DATA MIGRATION SYSTEM, AND NODE

CROSS-REFERENCE TO RELATED APPLICATION

This application claims priority pursuant to Japanese patent application No. 2020-135623, filed on Aug. 11, 2020, the entire disclosure of which is incorporated herein by reference.

BACKGROUND

Technical Field

The present invention relates to a data migration method, a data migration system, and a node.

Related Art

Distributed ledger technology using blockchain (also referred to as BC hereinbelow) has appeared as a technology to replace transactions which have conventionally been made via a reliable central authority such as a financial institution or a government with transactions made directly between users in a peer-to-peer (P2P) manner.

Various derivative technologies of distributed ledger technology have been proposed and evolved. Currently, distributed ledger technology has the following main characteristics: (1) a transaction between participants of a distributed ledger is established not through a central authority, but through consensus building and approval by (any or specific) participants, (2) a plurality of transactions are grouped in a block, which is recorded like a chain in a distributed ledger called a blockchain, and the successive blocks are hashed, which makes it practically impossible to falsify them, and (3) all the participants share the same ledger data so that every participant can check transactions.

Due to the above characteristics, distributed ledger technology using BC is being considered to be applied to a wide variety of sectors, such as finance and manufacturing industries, as a system for reliable management and sharing of data or execution and management of transactions based on contracts.

With use of a framework for providing a distributed ledger (hereinafter called a distributed ledger framework), a plurality of entities (such as, for example, corporates forming a consortium or a supply chain in a particular industry) can share information and conduct transactions with each other without being administered by a central authority.

Note that a blockchain or distributed ledger is called a "consortium type" when only computers approved by particular one or more bodies or individuals are participants in transactions.

This consortium type is advantageous in that a transaction is approved fast due to the presence of an administrative entity that authenticates participants. For this reason, when distributed ledger technology is used within a consortium in a particular industry, a consortium-type distributed ledger framework is typically used.

To be able to support complicated transaction conditions and various applications, some distributed ledger frameworks can manage logic where not only transaction data but also transaction conditions are described in a distributed ledger. This logic is called a smart contract (also referred to as SC hereinbelow). Technology concerning a distributed ledger framework with the above-described capability to execute an SC is disclosed in "Hyperledger Fabric", [online], [searched on May 7, 2020], Internet <URL: http://hyperledger-fabric.readthedocs.io/en/latest/>.

In such a distributed ledger framework, a transaction (also referred to as TX hereinbelow) is accepted while consensus is built under a predetermined consensus standard between nodes constituting the distributed ledger framework, and each node executes the TX and retains the result of the TX, thereby allowing information (a ledger) to be shared on the nodes. The above distributed ledger framework also has an SC execution capability to execute predetermined logic with respect to a TX.

A number of cloud venders have emerged which provide a consortium-type BC using Platform as a Service (PaaS). Such a service is called a blockchain (BC) platform.

A related technique is described in Japanese Patent Application Publication No. 2005-208757.

After starting to use an application or a service that utilizes a BC platform (an old environment), a user of the BC platform may want to migrate to a BC platform run by a different vendor (a new environment).

The reasons for the need for migration may be that, for example, the service used by the user has been terminated, or the version or type of the BC framework assumed by the application or service no longer agrees with the BC platform side.

However, a typical BC platform does not permit information to be moved out of the platform, the information being, for example, raw data in a distributed ledger and pairs of a private key and a public key used for authenticating participating organizations and signing a TX. In such a case, the migration method is very limited, resulting in that needs of the user are not met most of the times.

In other words, it is expected that in many cases constraints in a BC platform hinder migration with a server capability. In this case, an environment before migration cannot be reproduced in an environment after migration, and the only way to migrate data is to read distributed ledger data in the old environment using the capability of the client side, and to write the data into the new environment and re-execute the data in the new environment.

However, a migration method using such a capability on the client side is unlikely to be effective in a case where an SC in the old environment refers to information in an external system of IoT or the like and writes data into a BC based on the result of the reference.

For example, when a client in a new environment re-executes a past TX in the old environment, information obtained from an external system is not necessarily the same as the one obtained in the old environment (i.e., when the TX is executed in the old environment), and then the same execution result cannot be derived, i.e., there is a possibility that the same data cannot be written into a BC in the new environment. Thus, an old environment cannot be reproduced by re-execution of a TX in a new environment.

SUMMARY

Thus, the present invention has an object to provide a technique that makes it possible to achieve favorable migration of data between clients in old and new PaaS environments by reproducing an old state in the old environment even in a case where a TX to be executed is linked to an external system.

A data migration method of this disclosure to solve the objective comprises, by means of a management server configured to perform data migration between blockchain platforms, obtaining transaction information from a distributed ledger in a blockchain platform at a data migration source, and transmitting a migration transaction to a distributed ledger node in a blockchain platform at a data migration destination, the migration transaction specifying a transaction ID indicated by the transaction information obtained; and, by means of the distributed ledger node, receiving the migration transaction and obtaining transaction information in the distributed ledger at the data migration source based on the transaction ID, extracting data on a predetermined processing result from the transaction information obtained and executing a transaction which is based on the transaction information using the extracted data as an argument, and transmitting a result of the transaction executed to a transaction distribution node at the data migration destination.

A data migration system of this disclosure comprises a management server configured to perform data migration between blockchain platforms and includes a communication device that communicates with devices in the blockchain platforms via a network, and an arithmetic device configured to obtain transaction information from a distributed ledger in the blockchain platform at a data migration source, and transmit a migration transaction to a distributed ledger node in the blockchain platform at a data migration destination, the migration transaction specifying a transaction ID indicated by the transaction information obtained; and the distributed ledger node that includes a communication device that communicates with the devices in the blockchain platforms, a storage device that retains a distributed ledger, and an arithmetic device configured to receive the migration transaction from the management server, obtain transaction information in the distributed ledger at the data migration source based on the transaction ID, extract data on a predetermined processing result from the transaction information obtained, execute a transaction which is based on the transaction information using the extracted data as an argument, and transmit a result of the executed transaction to a transaction distribution node at the data migration destination.

A node of this disclosure comprises a communication device that communicates with devices in blockchain platforms; a storage device that retains a distributed ledger, and an arithmetic device configured to receive a migration transaction transmitted from a management server performing data migration between the blockchain platforms, obtain transaction information in a distributed ledger at a data migration source based on a transaction ID which is indicated by the migration transaction and obtained from the distributed ledger in the blockchain platform at the data migration source, extract data on a predetermined processing result from the transaction information obtained, executes a transaction which is based on the transaction information using the extracted data as an argument, and transmit a result of the executed transaction to a transaction distribution node at a data migration destination.

The present invention makes it possible to achieve favorable migration of data between clients in old and new PaaS environments by reproducing an old state in the old environment even in a case where a TX to be executed is linked to an external system.

BRIEF DESCRIPTION OF THE DRAWINGS

FIG. 10 is a diagram showing an example configuration of a migration program table of the present embodiment.

FIG. 18 is a diagram showing an example screen outputted in the present embodiment.

DETAILED DESCRIPTION OF EMBODIMENTS

<<Network Configuration>>

Figure 1:
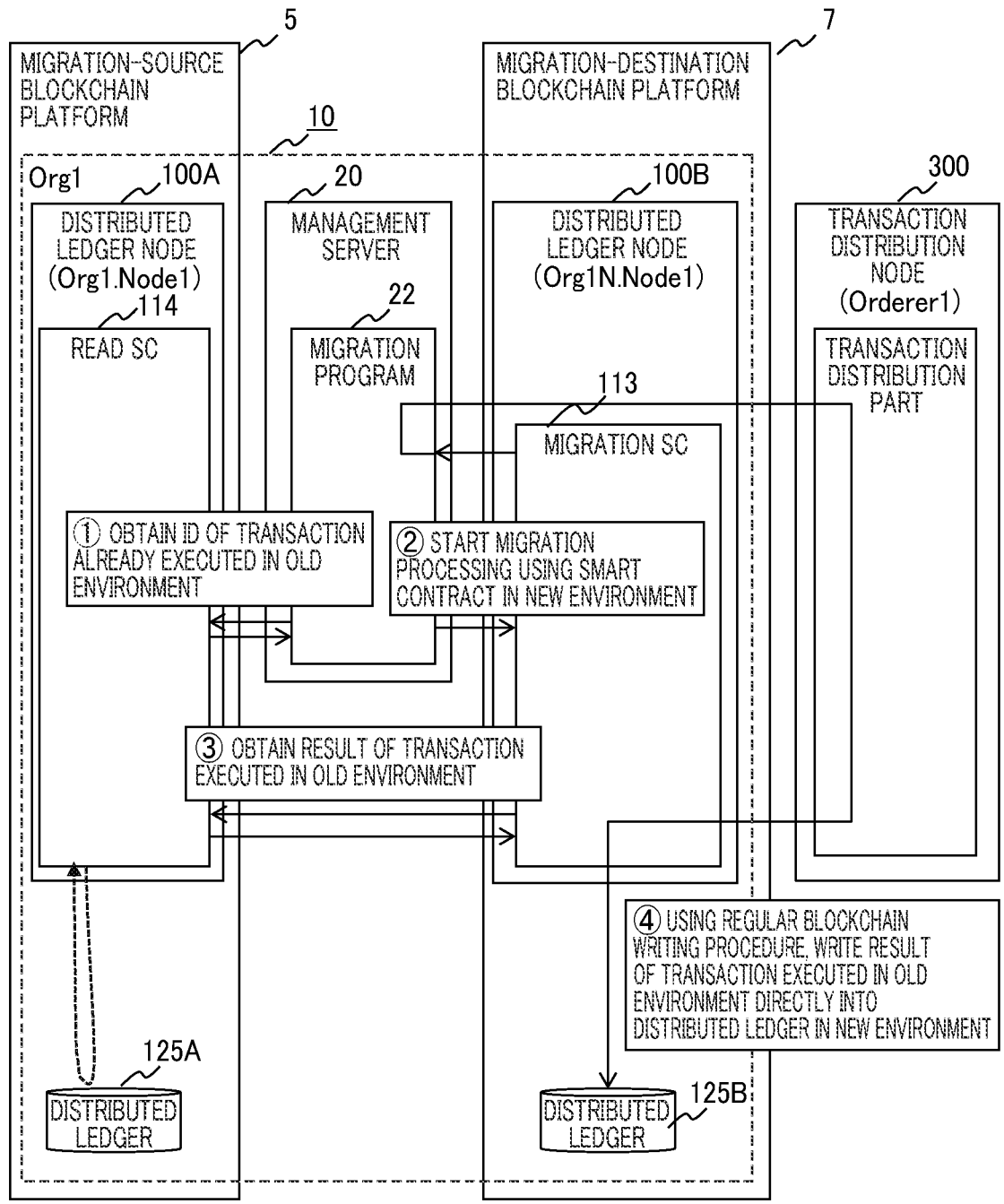
FIG. 1 is a diagram showing an overview of a data migration environment of the present embodiment.

An embodiment of the present invention is described in detail below using the drawings. FIG. 1 is a diagram showing an overview of a data migration environment of the present embodiment, and FIG. 2 is a diagram showing a network configuration including a data migration system 10 of the present embodiment.

Figure 2:
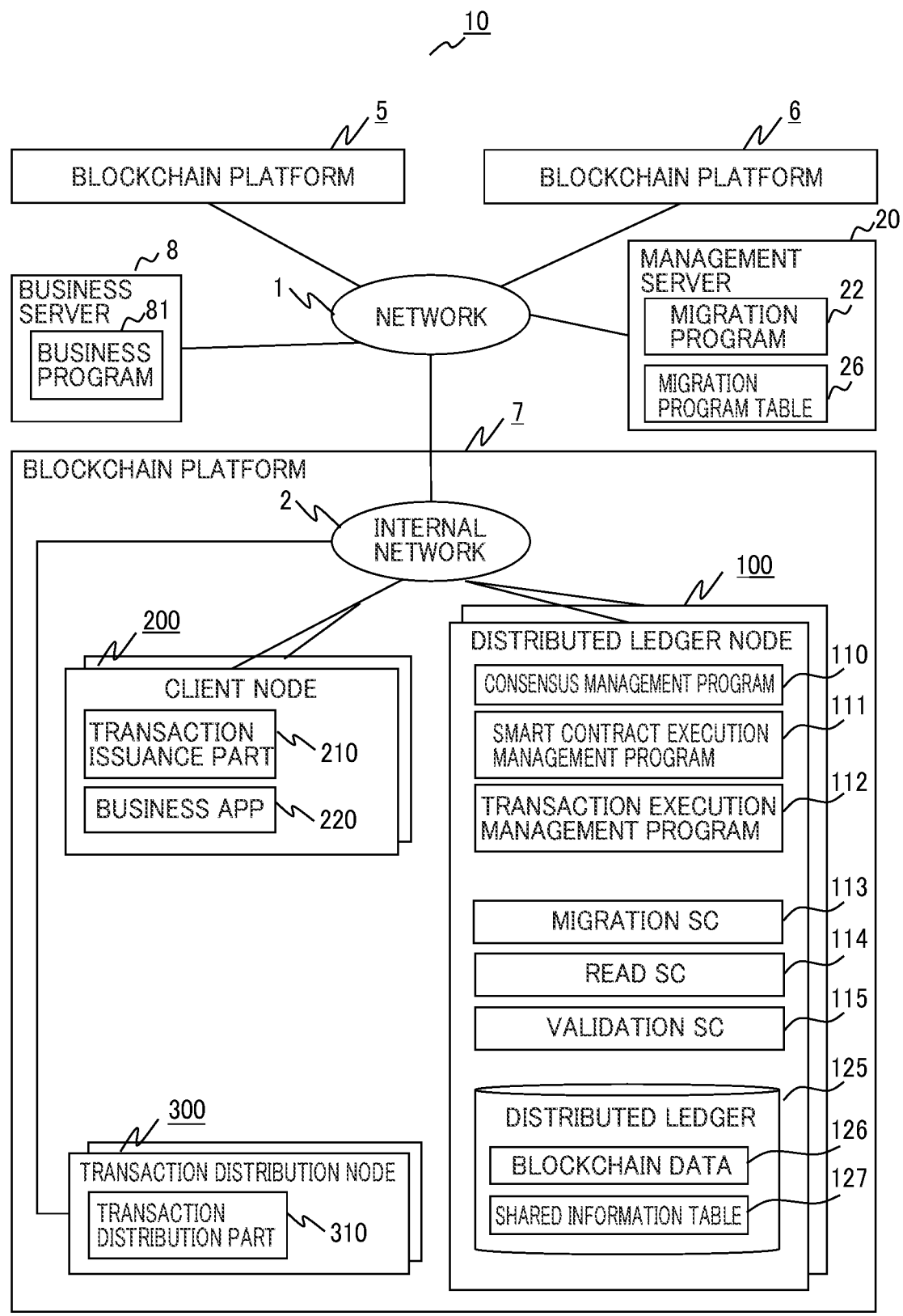
FIG. 2 is a diagram showing a network configuration including a data migration system of the present embodiment.

The data migration system 10 shown in FIG. 2 is a computer system capable of achieving favorable migration of data between clients in old and new PaaS environments by reproducing a past state in the old environment even when a TX to be executed is linked to an external system.

More specifically, the data migration system 10 migrates data on a blockchain retained in a distributed ledger of a user of a service provided on a blockchain platform which is run based on an open-source blockchain framework called Hyperledger Fabric.

Herein, a blockchain platform at a migration source, i.e., in an old environment is referred to as a migration-source blockchain platform 5, and a blockchain platform at a migration destination, i.e., in a new environment is referred to as a migration-destination blockchain platform 7.

As exemplified in FIG. 1, the present embodiment assumes a situation where an organization "Org1" that uses the migration-source blockchain platform 5, which is the old environment, migrates a blockchain stored in a distributed ledger 125A in a distributed ledger node 100A to a distributed ledger 125B in a distributed ledger node 100B on the migration-destination blockchain platform 7, which is the new environment.

When described without any distinction between the new and old environments, a distributed ledger node is called a distributed ledger node 100. General capabilities and configuration of the distributed ledger node 100 are now described. After deploying a smart contrast (also referred to as SC hereinbelow) through the capability of a smart contract execution management program 111 (also referred to as an SC execution management program hereinbelow), the distributed ledger node 100 receives a transaction (also referred to as a TX hereinbelow) via a network 2 through the capability of a transaction execution management program 112, and performs consensus building with other distributed ledger nodes through the capability of a consensus management program 110 to determine whether the TX can be accepted.

After building consensus regarding the TX, the distributed ledger node 100 executes the TX with respect to the deployed SC through the capability of the SC execution management program 111, records the history of the TX in blockchain data 126 in the distributed ledger 125, and records state information based on the execution result of the TX in a shared information table 127.

In such an environment, the distributed ledger node 100A in the migration-source blockchain platform 5 has a read SC 114. The read SC 114 is a smart contract for referring to transaction information and block information already registered in a blockchain in the distributed ledger 125A on the old environment side.

The read SC 114 retains functions for, for example, obtaining a transaction based on a transaction ID and obtaining block information including a transaction based on a transaction ID.

A management server 20 is, for example, a server apparatus run by the organization "Org1". The management server 20 has at least a migration program 22. The migration program 22 is a program that may activate and lead the data migration method of the present invention in response to, for example, a migration start request from a user or a migration execution request from a migration program in a different organization.

The distributed ledger node 100B in the migration-destination blockchain platform 7 has a migration SC 113. Based on a migration transaction distributed from the management server 20, the migration SC 113 extracts read-set and write-set values from a corresponding transaction in the distributed ledger 125A in the old environment, and executes (simulates) the transaction in the new environment using the read-set and write-set values as arguments. The migration SC 113 returns the result of the simulation to the management server 20.

The above-described read-set and write-set values are included in a transaction issued by a transaction issuance part 210 in a client node 200 and are obtained by the old-environment distributed ledger node 100A by, for example, communicating with a business program 81 in a business server 8 shown in FIG. 2 in response to, for example, a request from a business app 220.

The business server 8 is a system external to the blockchain platforms, and is communicatively coupled to each blockchain platform via a network 1 such as the Internet.

Specific examples conceivable as such an external system include an IoT system such as a manufacturing execution system (MES) or a product lifecycle management (PLM), a commercial distribution system such as electronic data interchange (EDI), a logistics system such as a warehouse management system (WMS) or a transport management system (TMS), a cash management system (CMS), a key system for accounting, a different blockchain platform, a storage system, and files in a format such as CSV and TEXT placed on a server. The external system may be any system that can be accessed by the distributed ledger nodes 100 on the blockchain platforms.

Meanwhile, the management server 20 receives the result of the transaction execution from the distributed ledger node 100B, and transmits this to a transaction distribution node 300. The transaction distribution node 300 is what is called an orderer in Hyperledger Fabric.

The transaction distribution node 300, an orderer, generates a transaction to request consensus building based on the transaction execution result received from the management server 20, and distributes this transaction to the distributed ledger nodes in the organization through a transaction distribution part 310. Thereby, the transaction distribution node 300 is a node that establishes the order of transactions to be stored in each distributed ledger 125 in the organization and distributes a new block.

Thus, a result of transaction execution (simulation) in the new-environment distributed ledger node 100B based on a transaction ID in the old-environment distributed ledger 125A is distributed from the transaction distribution node 300 to consensus-building nodes (endorsing peers) in the organization "Org1", and is stored in the distributed ledgers after a consensus is built.

<<Hardware Configuration>>

Figure 3:
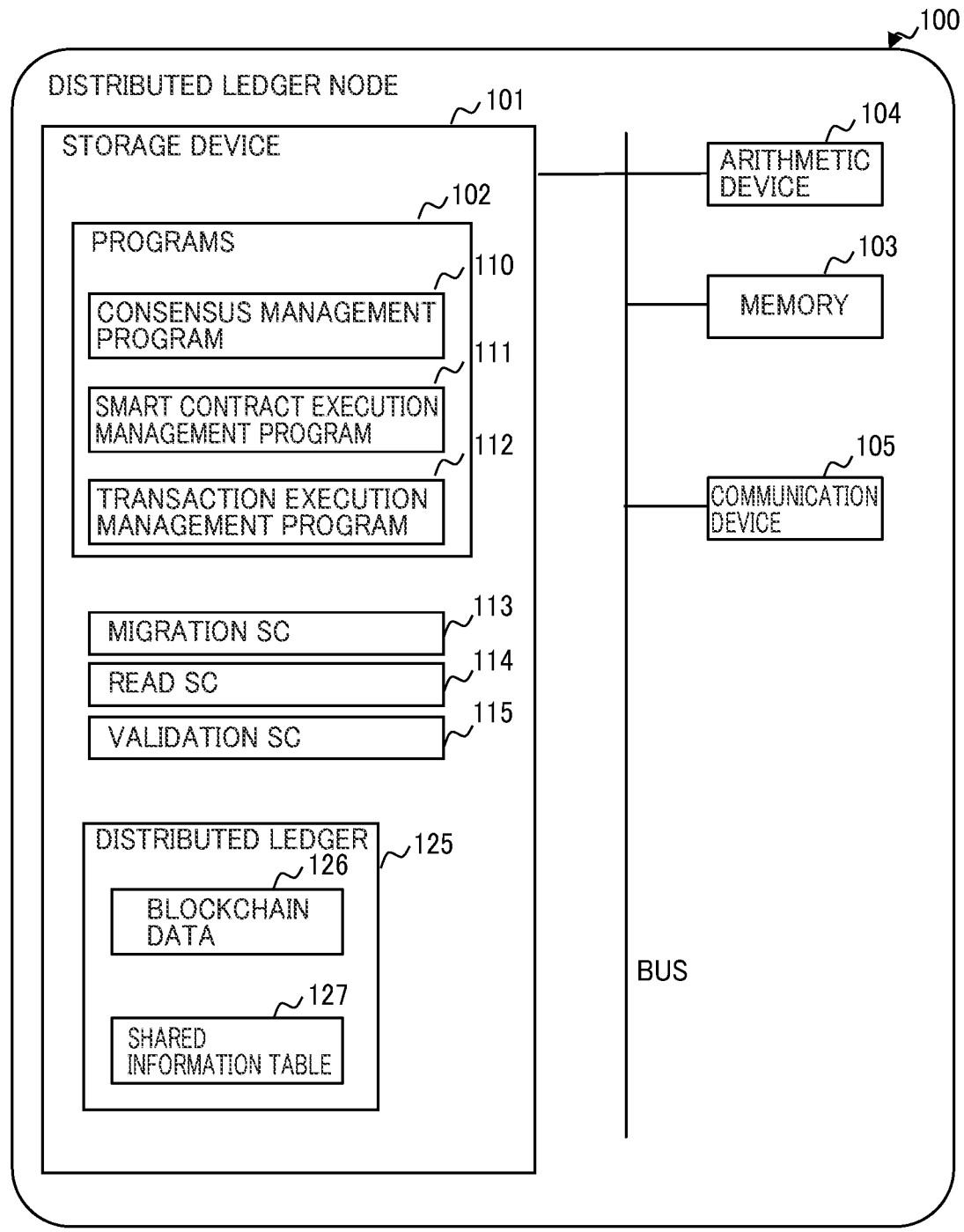
FIG. 3 is a diagram showing an example hardware configuration of a distributed ledger node of the present embodiment.

Next, example hardware configurations of the devices constituting the data migration system 10 are described. FIG. 3 is a diagram showing an example hardware configuration of the distributed ledger node 100 of the present embodiment.

The distributed ledger node 100 includes a storage device 101, a memory 103, an arithmetic device 104, and a communication device 105.

The storage device 101 is a solid-state drive (SSD), a hard disk drive, or the like formed by appropriate nonvolatile memory elements.

The memory 103 is a random-access memory (RAM) or the like formed by volatile memory elements.

The arithmetic device 104 is a CPU that performs overall control of the data migration system 10 and various kinds of determination, computation, and control by executing programs 102 retained in the storage device 101 after, for example, loading the programs 102 onto the memory 103.

The programs 102 include the consensus management program 110, the smart contract execution management program 111, and the transaction execution management program 112 mentioned earlier.

The communication device 105 is a network interface card coupled to the networks 1, 2 to communicate with other devices.

In addition to the programs 102 for implementing capabilities necessary as the distributed ledger node 100 of the present embodiment, the storage device 101 stores at least the migration SC 113, the read SC 114, a validation SC 115, and the distributed ledger 125.

Detailed description of the migration SC 113, the read SC 114, and the validation SC 115 will be given later.

The distributed ledger 125 includes the blockchain data 126 and the shared information table 127. The configuration of the distributed ledger 125 is the same as that of a typical distributed ledger.

Figure 4:
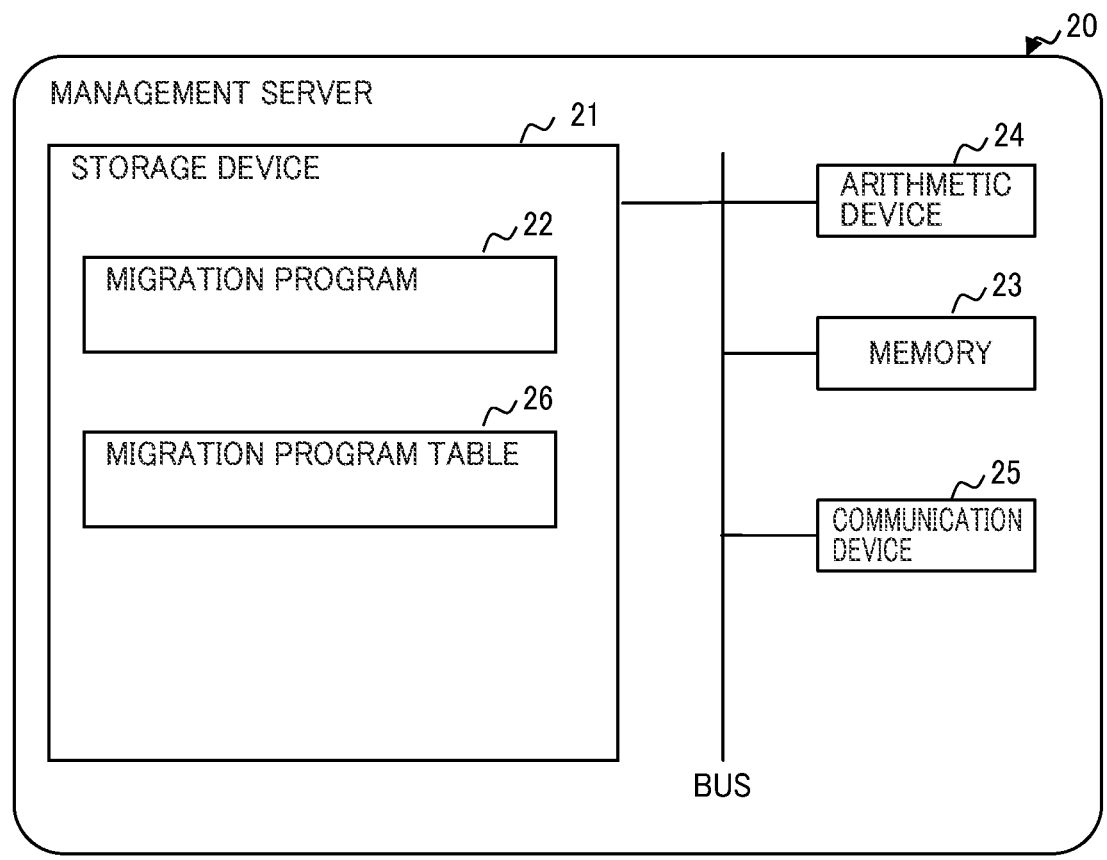
FIG. 4 is a diagram showing an example hardware configuration of a management server of the present embodiment.

Next, FIG. 4 shows an example hardware configuration of the management server 20 of the present embodiment. The management server 20 of the present embodiment includes a storage device 21, a memory 23, an arithmetic device 24, and a communication device 25.

The storage device 21 is a solid-state drive (SSD), a hard disk drive, or the like formed by appropriate nonvolatile memory elements.

The memory 23 is a RAM or the like formed by volatile memory elements.

The arithmetic device 24 is a CPU that performs overall control of the management server 20 and various kinds of determination, computation, and control by executing a program 22 retained in the storage device 21 after, for example, loading the programs 22 onto the memory 23.

The program 22 includes at least the migration program 22 already mentioned. In addition to the program 22, the storage device 21 also retains a migration program table 26. The migration program table 26 will be described in detail later.

The communication device 25 is a network interface card coupled to the networks 1, 2 to communicate with other devices.

Figure 5:
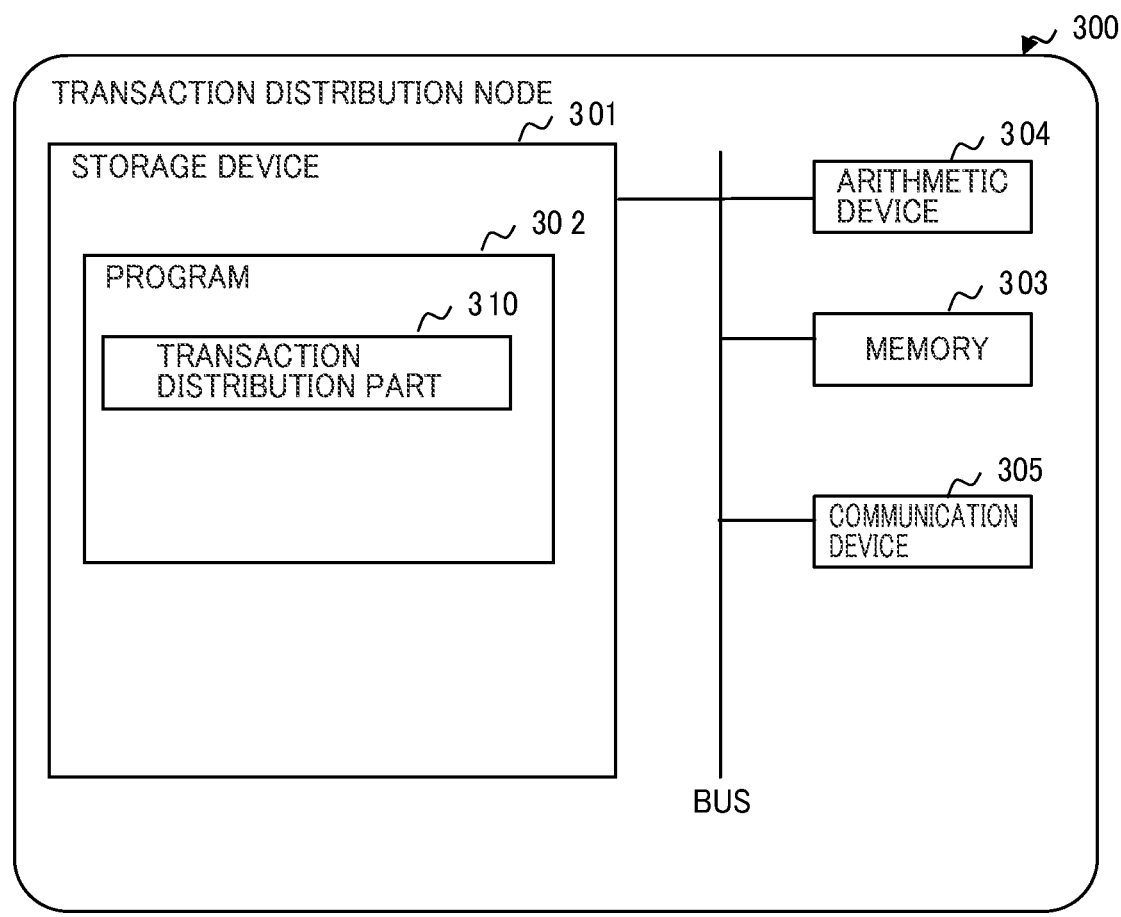
FIG. 5 is an example hardware configuration of a transaction distribution node of the present embodiment.

Next, FIG. 5 shows an example hardware configuration of the transaction distribution node 300 of the present embodiment. The transaction distribution node 300 of the present embodiment includes a storage device 301, a memory 303, an arithmetic device 304, and a communication device 305.

The storage device 301 is a solid-state drive (SSD), a hard disk drive, or the like formed by appropriate nonvolatile memory elements.

The memory 303 is a RAM or the like formed by volatile memory elements.

The arithmetic device 304 is a CPU that performs overall control of the transaction distribution node 300 and various kinds of determination, computation, and control by executing a program 302 retained in the storage device 301 after, for example, loading the program 302 onto the memory 303.

The program 302 is a program for implementing the transaction distribution part 310 already mentioned.

The communication device 305 is a network interface card coupled to the networks 1, 2 to communicate with other devices.

<<Example Procedure: Main Procedure>>

An actual procedure for the data migration method of the present embodiment is described below based on some drawings. Various operations in the data migration method described below are implemented by programs that are loaded onto memory or the like and executed by devices constituting the data migration system 10, mainly the management server 20 and the distributed ledger node 100. The programs are formed by codes for performing the various operations described below.

Figure 6:
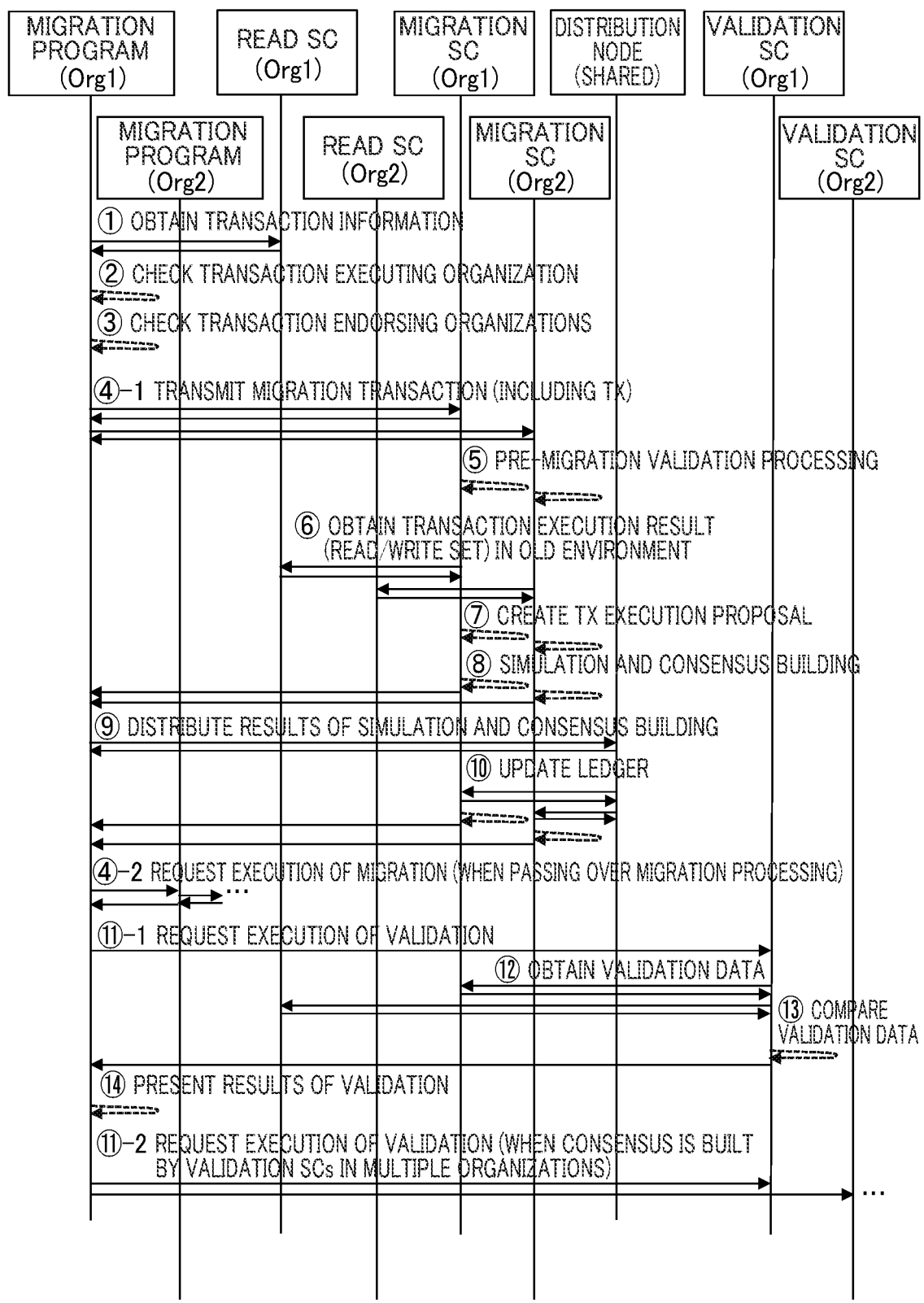
FIG. 6 is a diagram showing an example schematic sequence of a data migration method of the present embodiment.
Figure 7:
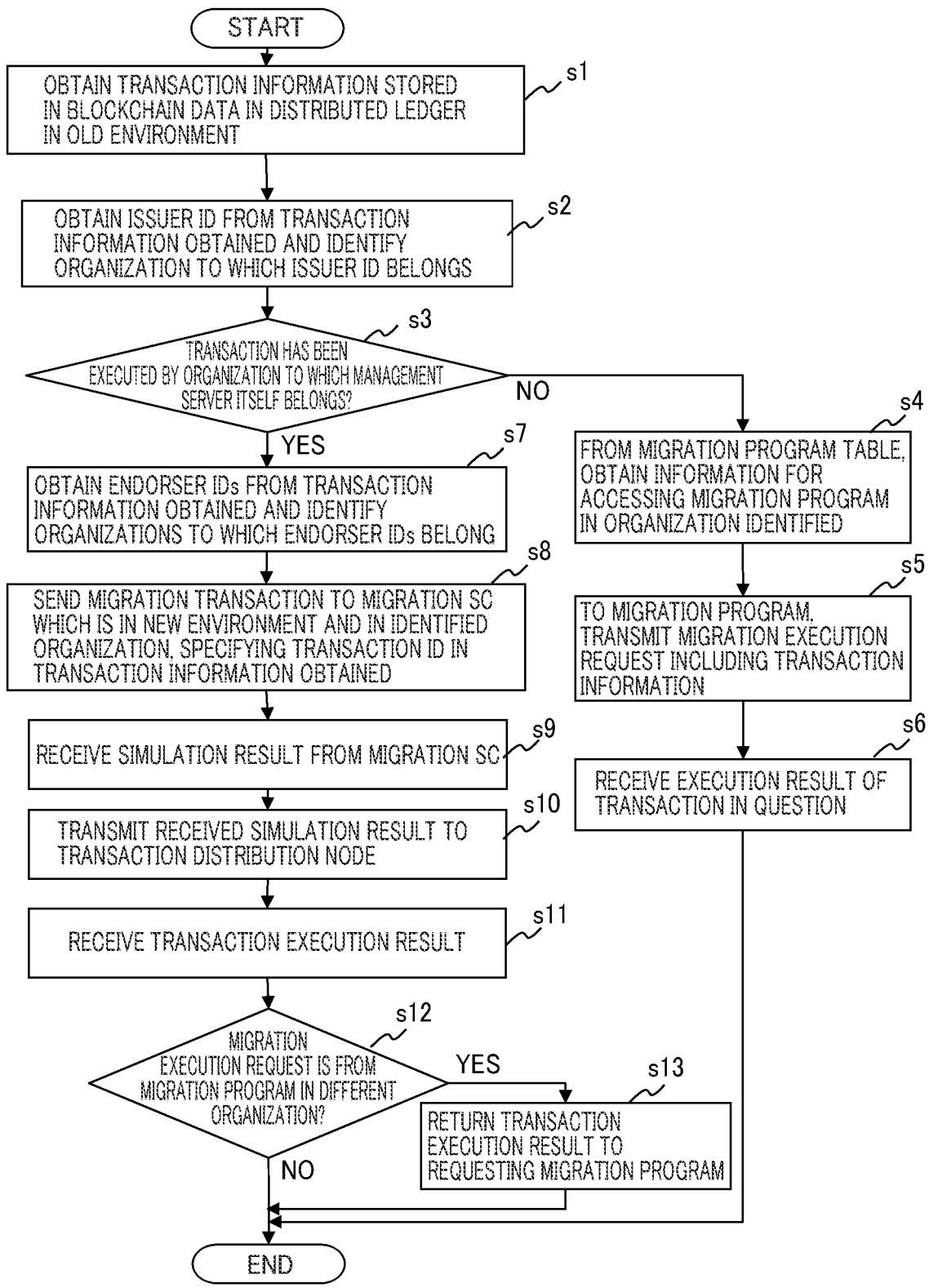
FIG. 7 is a diagram showing an example procedure of the data migration method of the present embodiment.

FIG. 6 is a diagram showing an overview of an example sequence of the data migration method of the present embodiment. FIG. 7 is a diagram showing an example procedure of the data migration method of the present embodiment. The sequence shown in FIG. 6 is the overall procedure, and each procedure included therein will be described thereafter.

For example, this procedure is started by one of the following two triggers. One is receiving a migration start request from a user through the client node 200. The other one is receiving a migration execution request from a migration program in a different organization.

In the main procedure, the migration program 22 of the management server 20 obtains transaction information stored in blockchain data in the distributed ledger 125 in the migration-source blockchain platform 5 (hereinafter referred to as an old environment) (s1).

Figure 8:
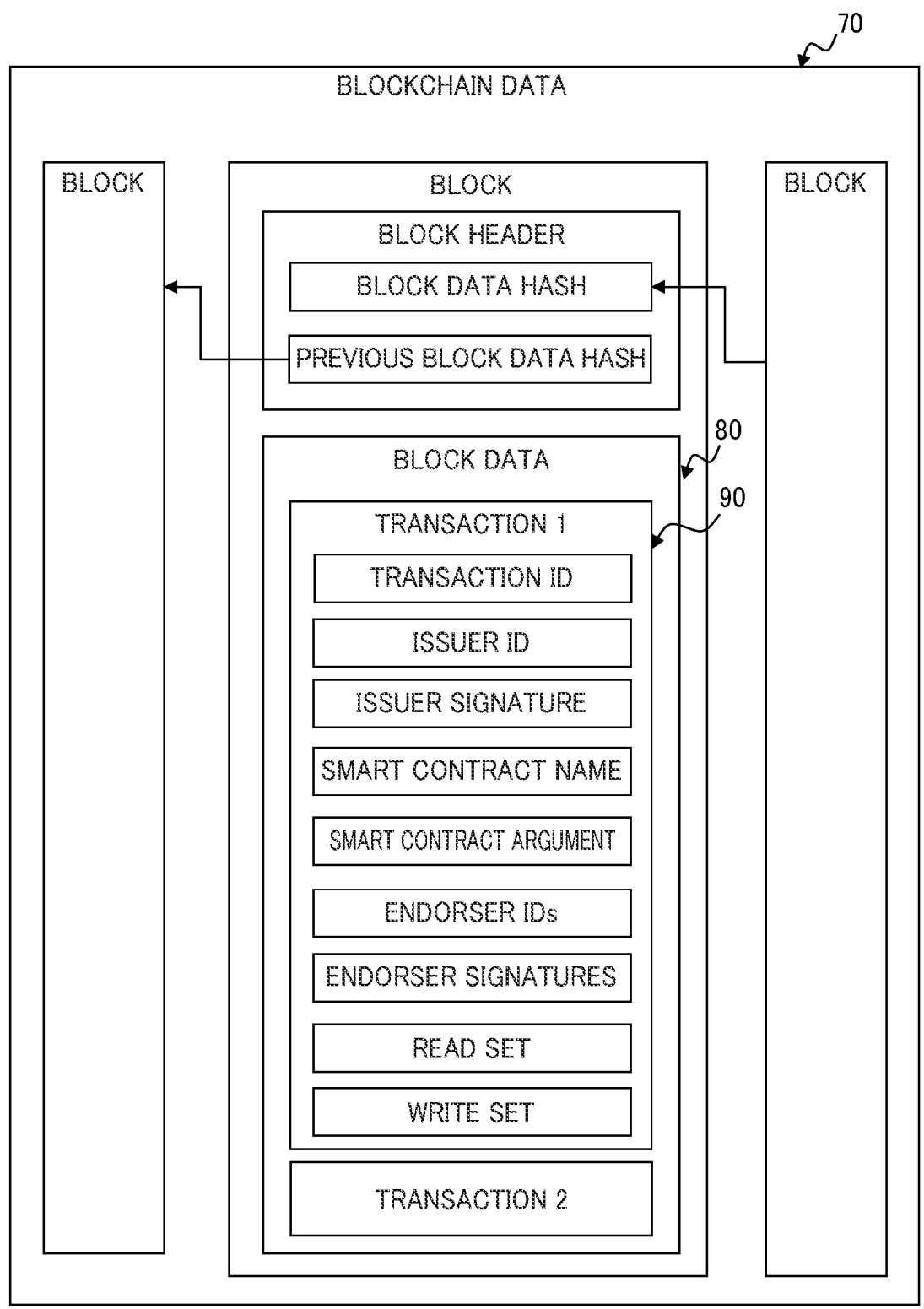
FIG. 8 is a diagram showing an example configuration of blockchain data of the present embodiment.
Figure 9:
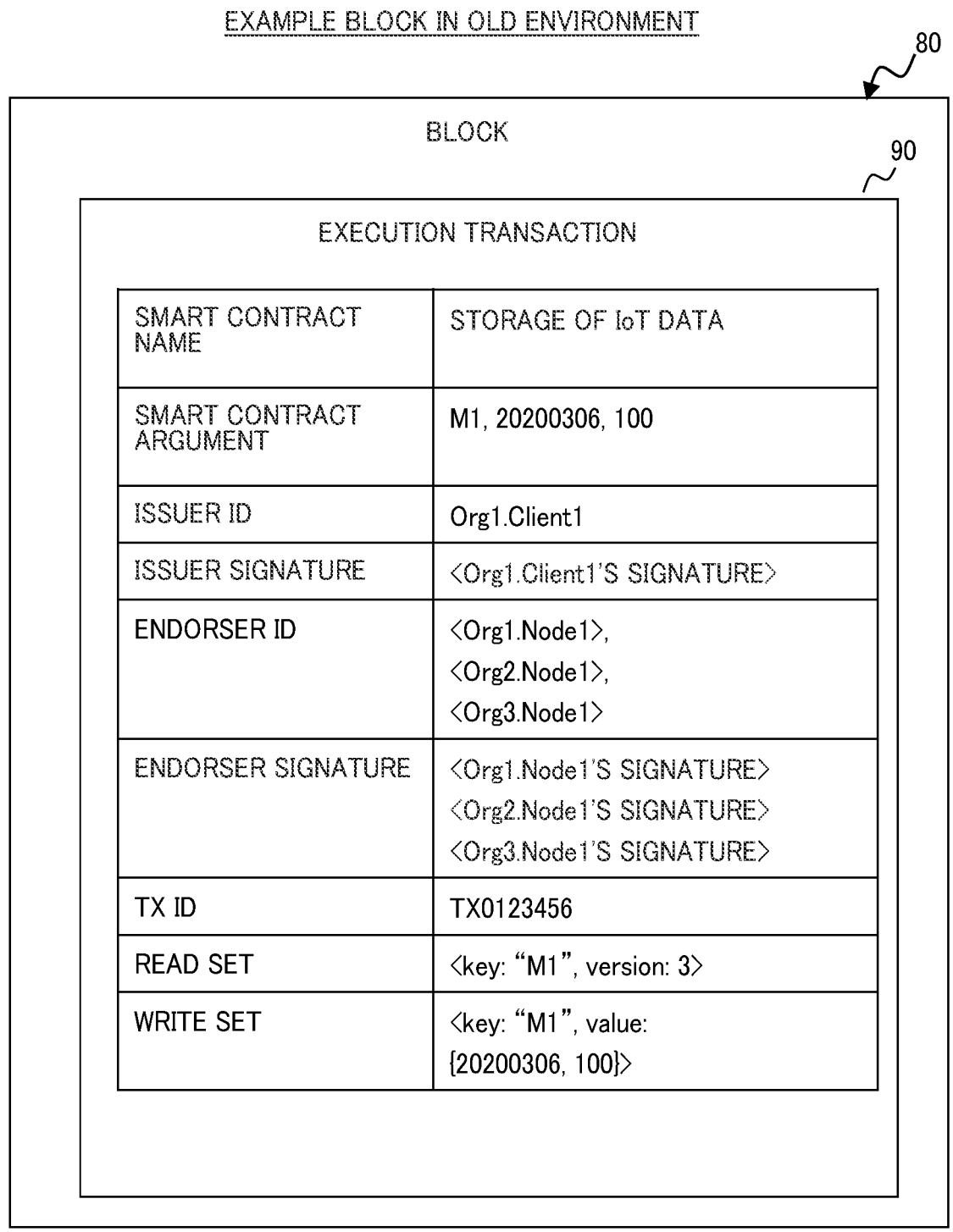
FIG. 9 is a diagram showing an example configuration of a block in an old environment in the present embodiment.

FIG. 8 shows an example of blockchain data 70 in the distributed ledger 125, and FIG. 9 shows block data 80 included in the blockchain data 70. As shown in FIG. 8, the blockchain data 70 is a chain of blocks each including the hash of the previous block in its block header.

Block data in each block typically includes a plurality of transactions 90 (though there is only one transaction in some cases). Each transaction 90 may include the following values: a transaction ID, a transaction issuer ID, a transaction issuer signature, a smart contract name, smart contract arguments, endorser IDs, endorser signatures, a read set, and a write set.

As exemplified in FIG. 9, the execution transaction 90 included in the block data 80 in the old environment is an example of a transaction concerning a smart contract where "Client 1" in the organization "Org1" obtains IoT data from the business server 8, an external system, and stores the IoT data in the distributed ledger 125. As shown in the read-set and write-set values, the IoT data indicates a value "100" observed on the date "20200306" concerning an event "M1".

The transaction information obtained here is information on a transaction to be migrated, and may be values such as, for example, a transaction ID, a timestamp, an issuer ID, and endorser IDs.

If, for example, transactions in all the blocks retained by the old-environment distributed ledger 125 are to be migrated, the migration program 22 obtains all the block information in the old-environment distributed ledger 125 sequentially from block number 1, extracts information on transactions in the blocks one by one, and executes them in a looped manner.

Since the issuer may be different for each transaction in a block, transaction information is obtained not on a block basis, but on a transaction basis.

To migrate only a particular transaction, the migration program 22 may, for example, receive specification of a TX ID from a user through the client node 200, set a transaction identified by the TX ID as a transaction to be migrated, and search the old-environment distributed ledger 125 to extract the transaction therefrom.

Instead of the search and extraction using a TX ID as a key, the following may be performed to set a transaction to be migrated. Specifically, for example, a user may specify a specific period, and the migration program 22 may extract only a transaction in the specific period based on timestamp information in the transaction information.

Next, the migration program 22 in the management server 20 of the organization "Org1" obtains an issuer ID from the transaction information obtained in s1, and identifies an organization to which the issuer ID belongs (s2).

For example, the migration program 22 may perform this identification of the issuer's organization as follows. The migration program 22 checks which organization's certification authority (CA) issues a certification for the client indicated by the issuer ID, and determines that the organization to which the CA belongs is the organization to which the client belongs.

Next, based on the result obtained in s2, the migration program 22 of the management server 20 determines whether the transaction indicated by the transaction information obtained in s1 has been executed by the organization "Org1" to which the management server 20 itself belongs (s3).

If it is determined that the transaction has not been issued by its own organization "Org1" (s3: No), the migration program 22 of the management server 20 obtains, from the migration program table 26 (see FIG. 10), information necessary to access the migration program 22 of the management server 20 in the organization identified in s2 (a different organization in this case) (s4).

The migration program table 26 is a table defining access information for accessing the migration program 22 in the management server 20 in each organization.

Next, the migration program 22 in the management server 20 of the organization "Org1" transmits a migration execution request containing the transaction information obtained in s1, to the migration program 22 in the management server 20 in the different organization the access information about which has been obtained in s4 (s5).

From the management server 20 of the different organization, the migration program 22 in the management server 20 of the organization "Org1" obtains a transaction execution result obtained about the different organization (s6), and then the main procedure ends.

If it is determined in s3 that the transaction has been issued by its own organization "Org1" (s3: Yes), the migration program 22 in the management server 20 of the organization "Org1" obtains endorser IDs from the transaction information obtained in s1, and identifies the organizations to which the endorser IDs belong (s7).

The migration program 22 in the management server 20 of the organization "Org1" sends a migration transaction to the migration SC 113 in the distributed ledger node 100 which is in the new environment and in the same organization by specifying the transaction ID of the transaction information obtained in s1 (s8).

In this processing, there are two possible cases: a case of combining the transaction ID of the migration transaction itself with the ID (in the old environment) of the transaction to be migrated, and a case of allocating a new transaction ID to the migration transaction itself and specifying the ID (in the old environment) of the transaction to be migrated as an argument for the function to execute the migration transaction.

To employ the former operation, the blockchain platform needs to be able to allow the issuer of a transaction to specify the ID of the transaction.

The "organization" here is basically the one identified in the previous step, but is not limited to this. Specifically, the organization may be, for example, all the organizations or one particular organization participating in the blockchain or an organization identified based on policy information pre-defining which organizations need to consent.

The migration program 22 in the management server 20 of the organization "Org1" receives a simulation result from the migration SC 113 responding to the migration transaction described above (s9). The details of the simulation performed by the migration SC 113 in response to the migration transaction will be described later.

The migration program 22 in the management server 20 of the organization "Org1" transmits the simulation result received in s9 to the transaction distribution node 300 (s10), and receives a result obtained by predetermined consensus building (s11).

Next, the migration program 22 in the management server 20 of the organization "Org1" determines whether s1 was triggered by a migration execution request from the migration program 22 in a different organization (s12). If it is determined that s1 was triggered by a migration execution request from the migration program 22 in a different organization (s12: Yes), the migration program 22 in the management server 20 of the organization "Org1" returns the transaction execution result to the migration program 22 in the different organization which made the migration execution request (s13), and the processing ends.

If it is determined that s1 was triggered not by a migration execution request from the migration program 22 in a different organization (s12: No), the migration program 22 in the management server 20 of the organization "Org1" ends the processing.

<<Example Procedure: Processing Performed by the Migration SC>>

Figure 11:
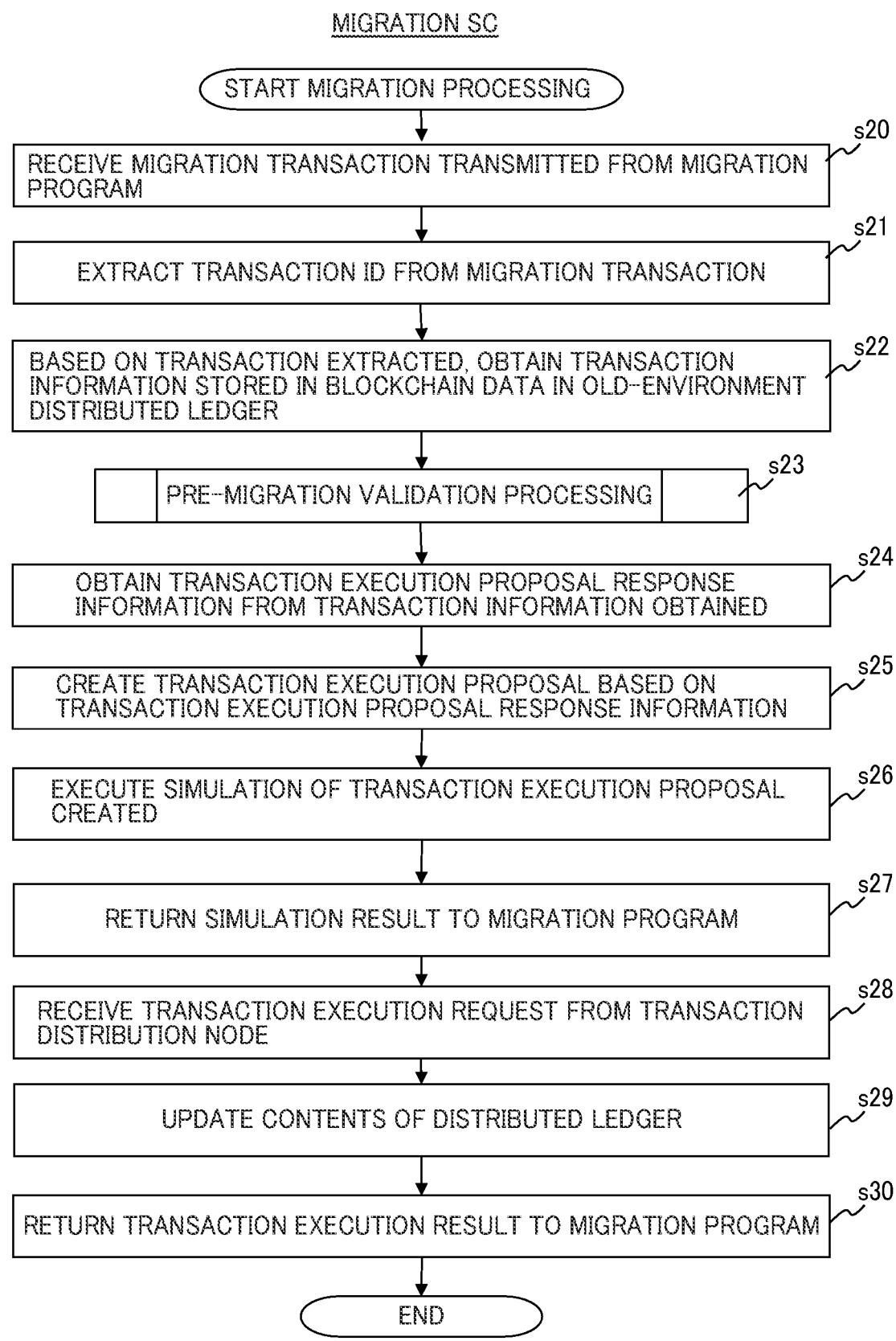
FIG. 11 is a diagram showing an example procedure of the data migration method of the present embodiment.

Next, the processing performed by the migration SC 113 in the distributed ledger node 100 is described based on the flowchart in FIG. 11. The processing described here is executed by the migration SC 113 in response to the migration transaction transmitted in s8 in the flowchart in FIG. 7.

First, the migration SC 113 in the distributed ledger node 100 receives the migration transaction transmitted by the migration program 22 in the management server 20 in s8 described above (s20).

It is assumed here that this migration transaction specifies transaction information (in the old environment) on a transaction to be migrated. The transaction information specified by the migration transaction is set as a transaction ID (the TX ID specified as an argument or the TX ID of the migration transaction).

Thus, the migration SC 113 extracts the transaction ID from the migration transaction (s21).

Based on the transaction ID extracted in s21, the migration SC 113 obtains transaction information stored in blockchain data in the distributed ledger 125 in the old environment (s22). The transaction information obtained here may be, for example, an issuer ID, a timestamp, and transaction execution proposal response information (read/write set).

The migration SC 113 executes pre-migration validation processing (s23), and proceeds to s24. This pre-migration validation processing will be described later.

The migration SC 113 obtains the transaction execution proposal response information from the transaction information obtained in s22 and validated in s23 (s24). This transaction execution proposal response information is, as described earlier, values of IoT data from the business server 8, and is read-set and write-set values included in the transaction. For example, the migration SC 113 obtains these values from the transaction through the read SC 114.

Instead of data from an external system, such as the values of IoT data from the business server 8 described above, the migration SC 113 may obtain, for example, a result of execution performed by its own system in a past state. In this case, the migration SC 113 writes the obtained execution result into the new environment, and can thereby reproduce the old environment at the migration source in the new environment at the migration destination.

Next, based on the transaction execution proposal response information obtained in s24, the migration SC 113 creates a transaction execution proposal (s25). Specifically, this is a transaction that instructs to re-execute the transaction (specified by the transaction ID obtained in s21) in a new environment with the read-set and write-set values used as arguments.

Based on the transaction execution proposal created in s25, the migration SC 113 executes, or simulates, the corresponding transaction in the new environment (s26), and returns the result of the simulation to the migration program 22 in the management server 20 (s27). This simulation result is transmitted from the migration program 22 in the management server 20 to the transaction distribution node 300 to be distributed to the distributed ledger nodes 100 as a transaction for which a consensus is to be built.

Figure 12:
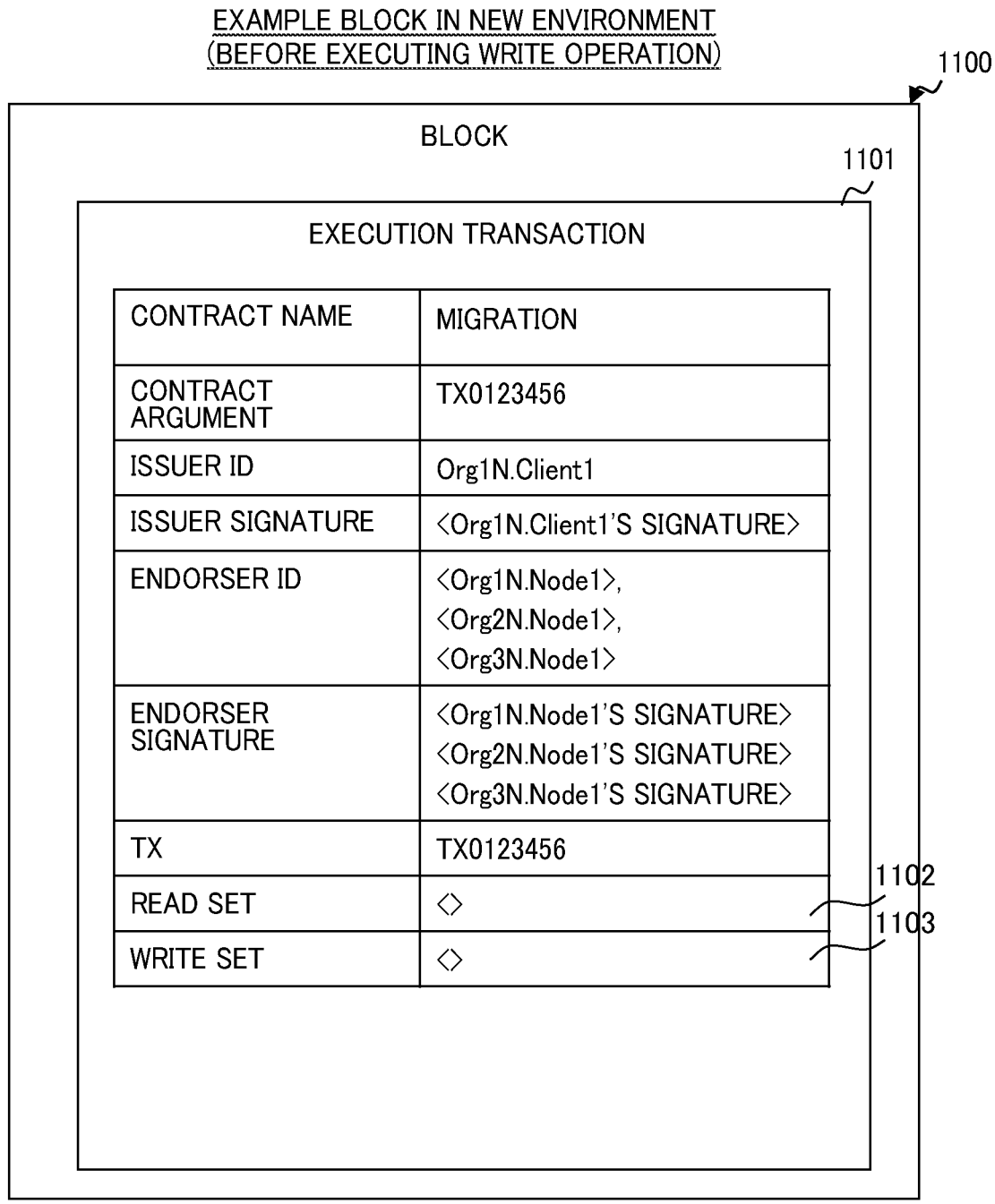
FIG. 12 a diagram showing an example configuration of a block in a new environment (before execution of a write operation) in the present embodiment.

Next, the migration SC 113 of the distributed ledger node 100 executes the transaction distributed from the transaction distribution node 300 as described above, builds a consensus with the other distributed ledger nodes 100, updates its own distributed ledger 125 from the state of a transaction 1101 in a block 1100 in FIG. 12 (which is before the execution of a write operation and the cells for read/write set values are blank) (s28, s29).

The migration SC 113 returns the transaction execution result obtained in S29 to the migration program 22 (s30), and ends the processing.

<<Example Procedure: Pre-Migration Validation>>

Figure 13:
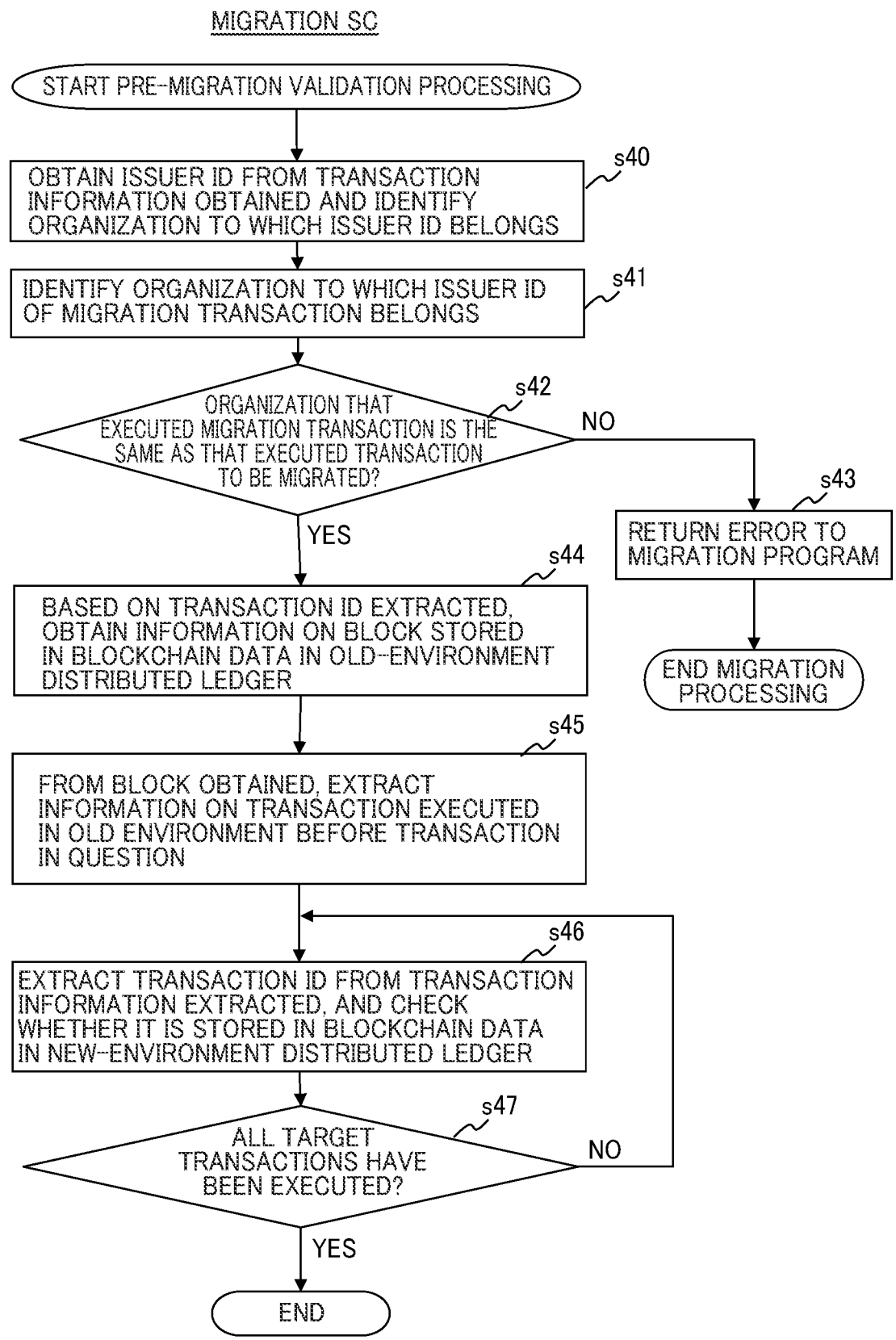
FIG. 13 is a diagram showing an example procedure of the data migration method of the present embodiment.

Next, the pre-migration validation processing (s23) performed in the above-described procedure is described in detail based on FIG. 13. This flowchart is processing for checking which organization is the issuer of the TX. Although such check has already been performed by the migration program 22 (since it is designed so that the migration program in the correct organization performs the check), the check is performed again here in case some wrongdoing occurs.

First, the migration SC 113 obtains the issuer ID from the transaction information obtained in s22, and identifies the organization to which the issuer ID belongs (s40).

The migration SC 113 also identifies the organization to which the issuer ID of the above-described migration transaction belongs (s41).

Next, the migration SC 113 determines whether the organizations identified in s40 and s41 are the same, i.e., whether the organization that executed the migration transaction is the same as the organization that executed the transaction to be migrated (s42).

If it is determined that the transaction is not executed by the same organization (s42: No), the migration SC 113 returns an error to the migration program 22 (s43), and ends the processing.

If it is determined that the transaction is executed by the same organization (s42: Yes), the migration SC 113 obtains information on a block stored in blockchain data in the old-environment distributed ledger 125, based on the transaction ID extracted from the migration transaction in s41 (s44).

The following processing is performed to check whether the transactions are executed in a correct order. In an overview, the order of transactions are identified on a block basis based on the block numbers of the blocks, and the order of transactions in each block is identified by reference to information on the block.

However, the pre-migration validation processing may be started from this step s44 or may end at the previous step s43.

Next, from the block obtained in s44, the migration SC 113 extracts information on a transaction executed in the old environment before the transaction in question (s45).

The migration SC 113 extracts a transaction ID from the transaction information extracted in s45, and checks whether the transaction ID (or the transaction identified by the transaction ID) is stored in the blockchain data in the distributed ledger 125 in the new environment (s46).

The migration SC 113 iterates s46 until all the target transactions are executed (s47: No→s46), and ends the processing.

<<Example Procedure: Post-Migration Validation Processing>>

Figure 14:
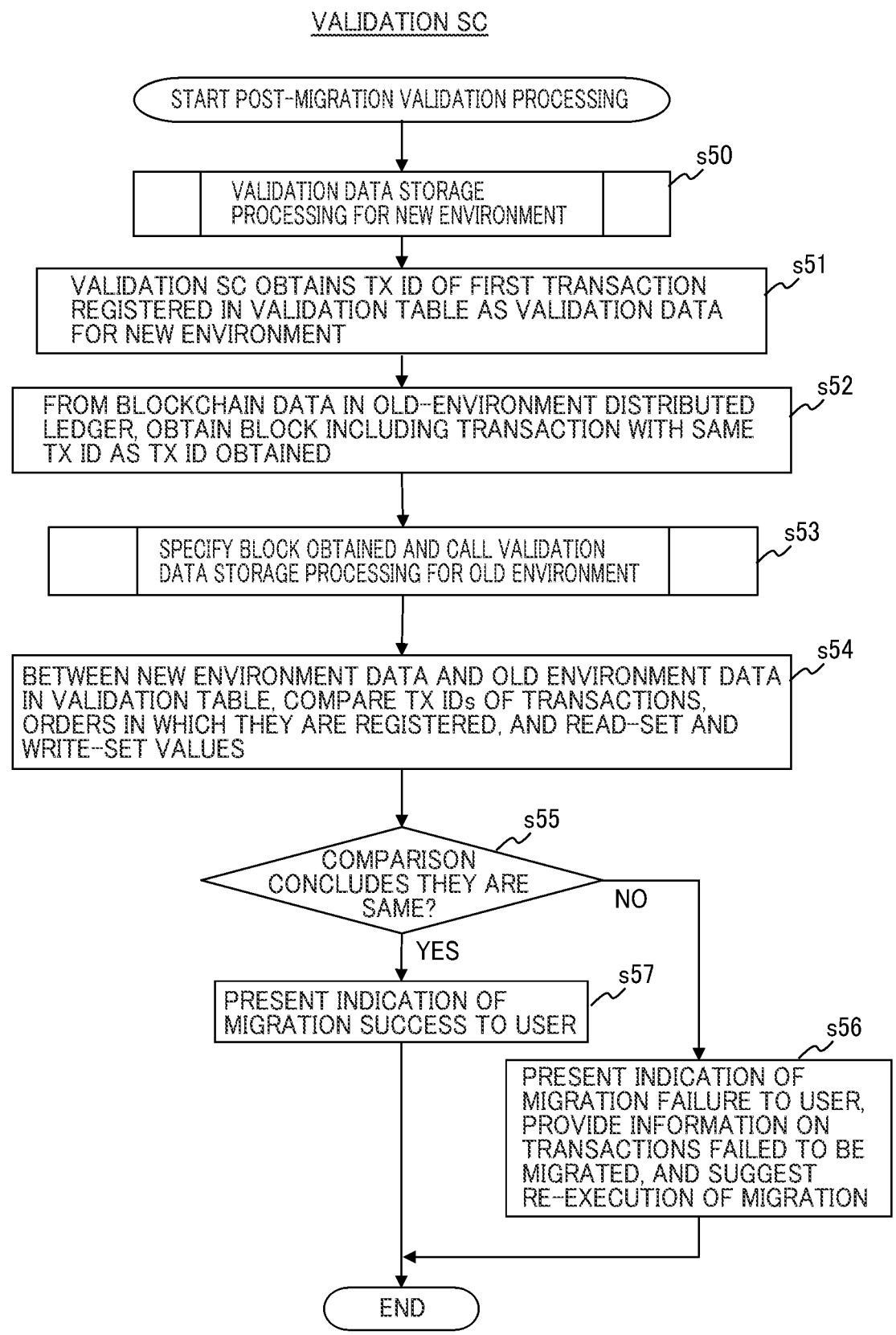
FIG. 14 is a diagram showing an example procedure of the data migration method of the present embodiment.

Next, validation processing performed after data migration between old and new environments is described based on FIG. 14. This procedure is executed by the validation SC 115 of the distributed ledger node 100 to validate whether all the transactions migrated to the new environment are written in the same order as those in the old environment.

This procedure may be started in response to an instruction from a user, the migration SC 113, or the migration program 22. Also, the processing may be automatically started after all the transactions (or blocks) are migrated from the old environment, or may be executed at any timing after migration (e.g., validation timing determined by a user).

The validation SC 115 executes validation data storage processing for the new environment (s50). Details of this processing will be given later, but basically, the processing is looped for all the transactions migrated to the new environment. As a result, a validation table storing information on transactions to be validated is generated.

To prepare for a case where there is a transaction in the new environment before the migration, for example, the transaction ID of the transaction that is migrated first may be recorded. If there is a special block such as a genesis block or a block for deploying an SC, such blocks are excluded from the transactions to be validated. A determination on whether a block is a special one or not can be made using, for example, transaction type information included in a transaction.

Next, the validation SC 115 obtains the TX ID of the first transaction registered in the validation table as validation data for the new environment (s51).

From the blockchain data in the distributed ledger 125 in the old environment, the validation SC 115 obtains a block including a transaction with the same TX ID as the TX ID obtained in s51 (s52).

The validation SC 115 specifies the block obtained in s52, and calls validation data storage processing for the old environment (s53). This processing is the same as that performed in s50 with only the target being changed to the old environment.

Next, between the data for the new environment and the data for the old environment in the validation table obtained in S50 and s53, respectively, the validation SC 115 compares the TX IDs of the transactions, the order in which the transactions are registered, and the read-set and write-set values (s54).

If it is determined as a result of the comparison that the data for the new environment and the data for the old environment in the validation table do not have the same values described above (s55: No), the validation SC 115 outputs an indication that the migration has failed and information on the transactions failed to be migrated, to, for example, the client node 200 to present them to a user, and suggests re-execution of migration (s56). Then, the validation SC 115 ends the processing.

In a case where the order in which the transactions are registered is different but the read-set and write-set values are the same in all the transactions, the validation SC 115 may present this to a user as described above. If the user responds with OK through the client node 200, the validation SC 115 may determine that the migration has succeeded.

If it is determined as a result of the comparison that the data for the new environment and the data for the old environment in the validation table have the same values described above (s55: Yes), the validation SC 115 outputs an indication that the migration has succeeded to the client node 200 to present it to the user (s57), and ends the processing.

Processing steps for validation described herein are performed solely by the validation SC 115 in a sole organization, and the result of the comparison performed by the validation SC 115 is directly used to determine whether the migration has succeeded or failed. However, the present invention is not limited to this.

For example, the comparison results may be stored in the distributed ledgers 125, and the validation SCs 115 in the respective organizations may execute the same comparison processing, and after executing a series of blockchain processing, namely, simulation, consensus building, and writing into the distributed ledger 125 through the transaction distribution node 300, use the results to determine whether the migration has succeeded or failed. In this case, the processing itself is the same as the regular processing for writing into a blockchain; thus, no description is given.

<<Validation Data Storage Processing>>

Figure 15:
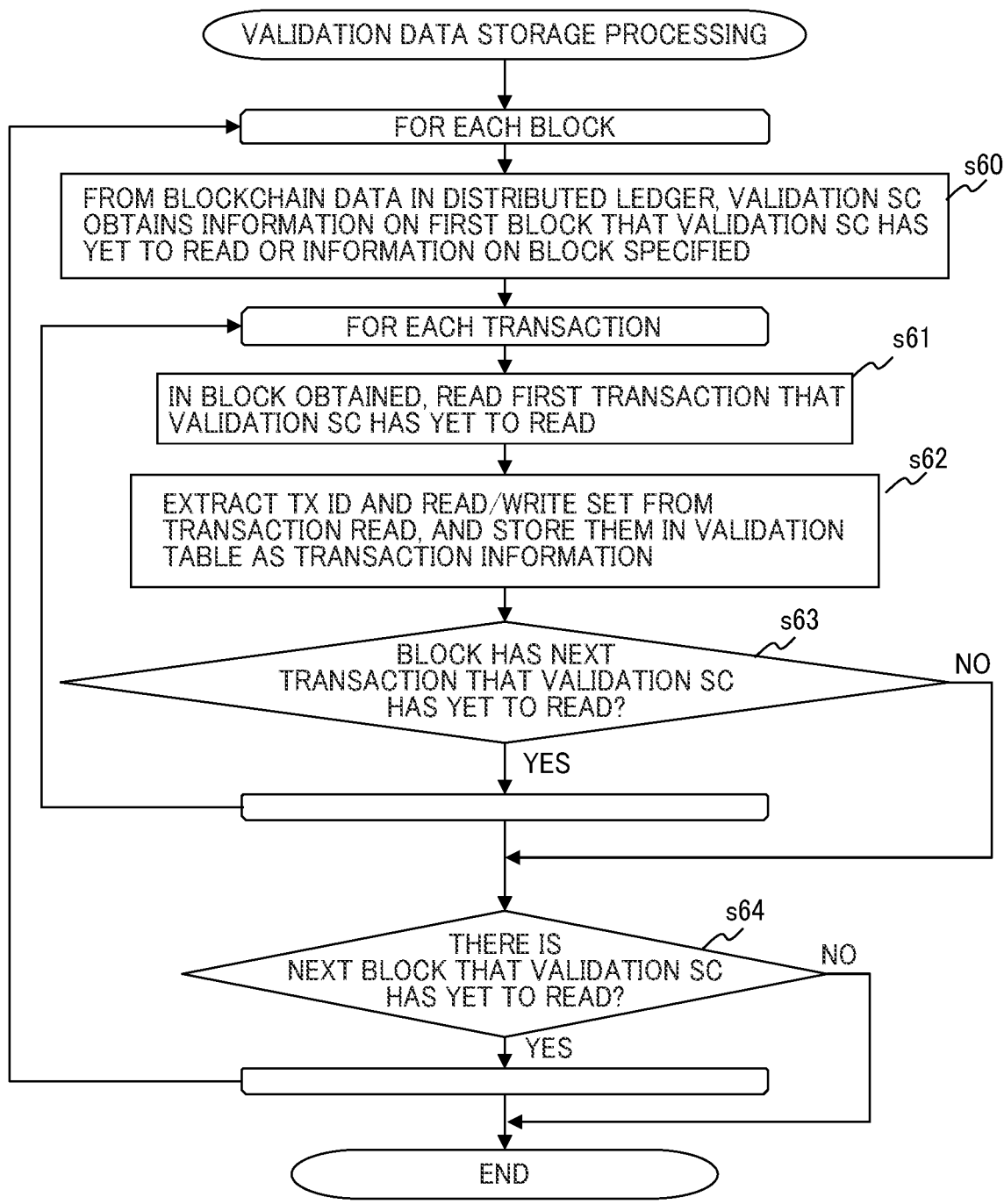
FIG. 15 is a diagram showing an example procedure of the data migration method of the present embodiment.

Next, the validation data storage processing (s50, s53) in the above-described flowchart is described in detail based on FIG. 15.

First, from the blockchain data in the distributed ledger 125, the validation SC 115 obtains information on the first block which the validation SC 115 has yet to read, or information on a block specified (s60).

Then, the validation SC 115 reads the first transaction in the block obtained in s60 which the validation SC 115 has yet to read (s61).

The validation SC 115 extracts the TX ID and the read-set and write-set values from the transaction read in s61, and stores these in a validation table as transaction information (s62). Although not shown, this validation table may be a table generated temporarily in the memory 103 of the distributed ledger node 100.

The validation SC 115 may also extract other transaction information which it wants to use as a migration success condition and store it in the validation table. In either case, information to be extracted and stored is not limited to the above.

Next, the validation SC 115 determines whether the block obtained in s60 has a next transaction which the validation SC 115 has yet to read (s63).

If it is determined that there is a transaction yet to be read (s63: Yes), the validation SC 115 loops the processing back to s61.

If it is determined that there is no transaction yet to be read (s63: No), the validation SC 115 determines whether there is a next block which the validation SC 115 has yet to read (s64).

If it is determined that there is a block yet to be read (s64: Yes), the validation SC 115 loops the processing back to s60.

If it is determined that there is no block yet to be read (s64: No), the validation SC 115 ends the processing.

<<Example Output Screens>>

Figure 16:
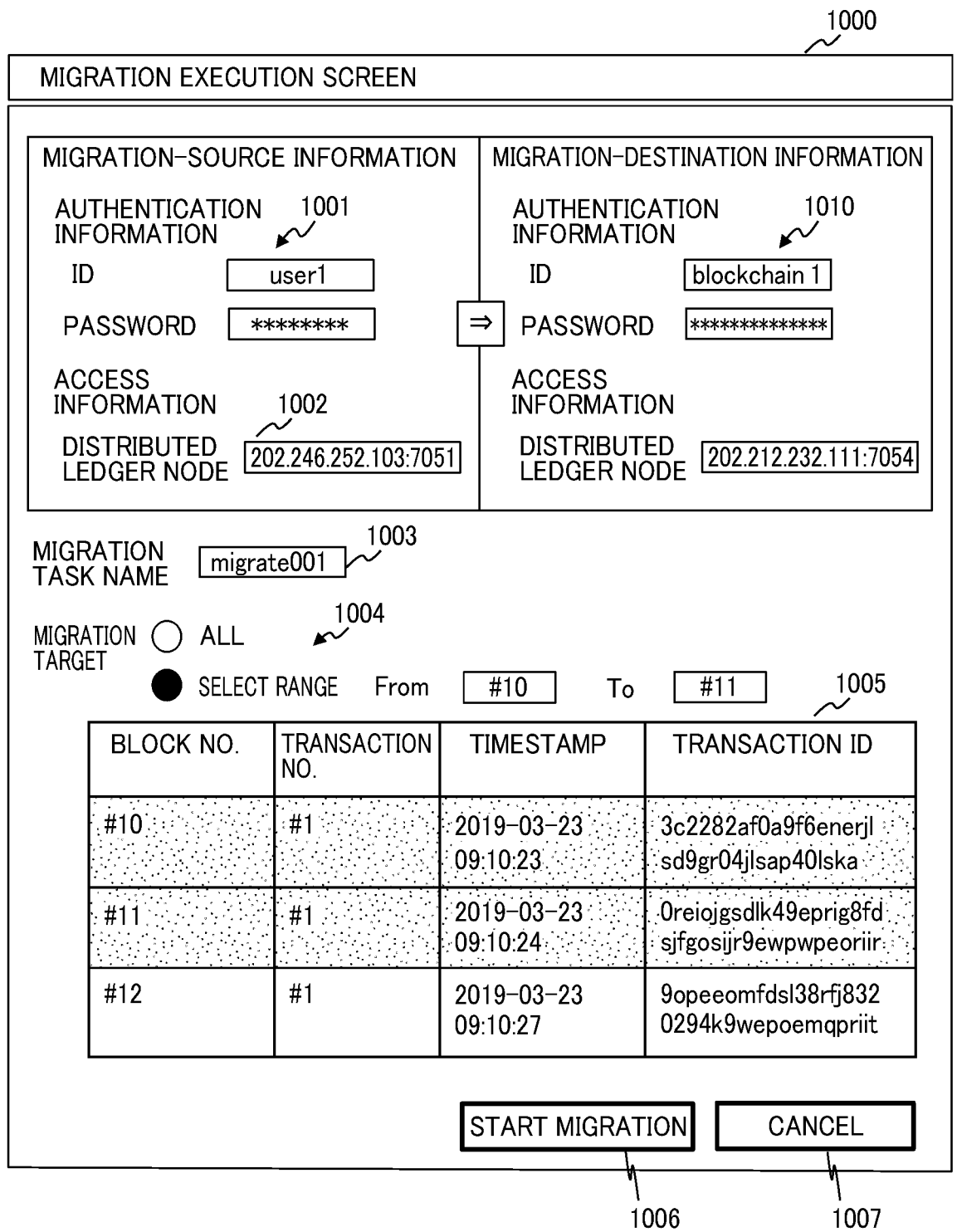
FIG. 16 is a diagram showing an example screen outputted in the present embodiment.

FIG. 16 shows an example of a migration execution screen 1000 in the present embodiment. This migration execution screen 1000 is distributed and displayed by the migration program 22 in the management server 20 for a user operating the client node 200 for example, to have the user specify information about the migration source and the migration destination.

As exemplified here, the user enters authentication information 1001 on this screen in order to obtain the certificate of the user registered beforehand in the certification authority (CA) in the migration-source blockchain platform.

Based on the authentication information 1001 above, the migration program 22 in the management server 20 (internally) specifies the certificate obtained from the CA in the migration-source blockchain platform, and accesses the distributed ledger node shown in access information 1002. Thereby, necessary information can be obtained and set. The same goes for migration destination information 1010.

A migration task name 1003 is a task name set by a user for management of migration processing. Of course, other values such as serial numbers may be used for the management.

A migration target specification UI 1004 is an interface which may be used by the user to select either one of the modes "ALL" and "SELECT RANGE." For instance, if a user wants to migrate all the blocks in the old environment, the user selects "ALL." In this case, information on all blocks (i.e., information on all transactions in each block) are targeted for migration sequentially from block number 1 (except for special blocks such as ones used for initialization).

If a user wants to migrate only specific transactions, the user selects "SELECT RANGE" and specifies the range with any one of block numbers, transaction numbers, timestamps, and transaction IDs as transactions to be migrated (only one transaction may be specified as well). When a user specifies a range and then clicks on a migration start button 1006, the client node 200 receives this, and the migration program 22 in the management server 20 starts data migration processing according to the procedure described above.

As shown in the example in FIG. 16, it may be conceivable to display a transaction list 1005 so as to allow the user to select transactions (and transactions selected may be automatically entered in "From" and "To"), but the present invention is not limited to this.

If a user clicks on a cancel button 1007, the migration processing is terminated. In this case, the migration status for this migration task shows "FAILED" on a migration progress screen (to be described later). The indication "FAILED" is of course just an example, and any other indication may be employed as long as it indicates that the migration has failed because the processing has been terminated by the user's operation.

For example, in order for the transactions that have been migrated from the start to the cancellation of migration to be deleted in the migration destination, the click on the cancellation button may cause an initialization execution command (such as setting a data sharing distributed ledger range) to be re-executed at the migration destination.

Figure 17:
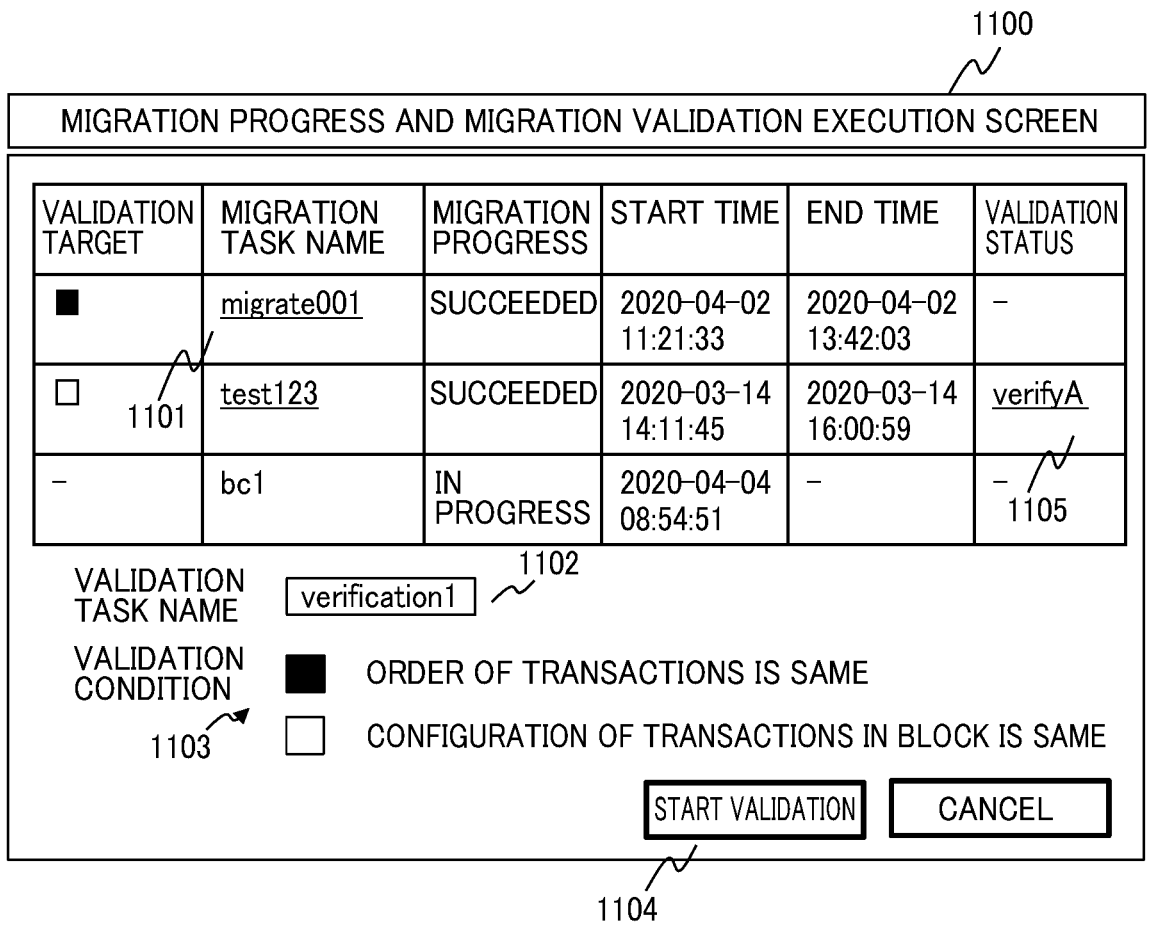
FIG. 17 is a diagram showing an example screen outputted in the present embodiment.

FIG. 17 shows an example of a migration progress and migration validation execution screen 1100. This migration progress and migration validation execution screen 1100 is a screen distributed to, for example, the client node 200 by the migration program 22 in the management server 20 or the migration SC 113 or the validation SC 115 in the distributed ledger node 100 to present information on time and migration processing execution status to a user.

On this screen, items concerning migration validation execution (which are, in FIG. 17, validation target, validation status, validation task name, and validation condition) are optional, and items concerning a migration processing task (migration task name, migration status, start time, and end time) are minimum constituents.

When a user clicks on a migration task name 1101 on this screen 1100, the migration program 22 in the management server 20 displays contents of the corresponding migration task (such as a list of transactions migrated). The user selects, from this list, a migration task to be validated for migration success/failure, and after specifying a validation task name 1102 and a validation condition 1103, presses a validation start button 1104. Receiving this, the migration program 22 in the management server 20 or the migration SC 113 or the validation SC 115 in the distributed ledger node 100 executes necessary procedures described above.

A task to be validated is only a task which has already been migrated. Thus, in the example shown, a migration task the migration status of which is "in progress" cannot be selected as a task to be validated. Also, in the example shown, the execution status of validation processing can be referred to in a validation status column 1105 as a validation task name to make it possible to check whether a task has already been validated in the past.

Although the validation condition 1103 shown in FIG. 17 includes "the order of transactions is the same" and "the configuration of transactions in a block is the same", the present invention is not limited to this, and other conditions may be employed.

Under the above condition "the configuration of transactions in a block is the same," it is also validated whether the transactions included in each block are the same between the migration source and the migration destination. This is because there are cases where even when transactions are written in the same order, transactions may be put in the same block in one case and then may be separated in different blocks in another case. It is of course up to the user about the level of uniformity the user wants, and there is no limitation regarding this.

FIG. 18 shows an example of a migration validation result screen 1200. The migration validation result screen 1200 is a screen distributed to, for example, the client node 200 by the migration program 22 in the management server 20 or the validation SC 115 in the distributed ledger node 100 to present migration validation results to a user.

The migration validation result screen 1200 is formed by validation task information 1210 and validation result details information 1220.

The validation task information 1210 is a screen for a user to manage validation processing tasks, and shows the execution status and time of validation processing.

The validation result details information 1220 is also a screen for a user to manage details about execution of validation processing tasks, and when a task is selected on the list shown in the validation task information 1210, the details of the validation task are displayed for each transaction.

Although a block number, a transaction number, and a transaction ID are compared in the example shown, there is no limitation as long as the information is included in a block or a transaction.

Although examples of three screens, namely the migration execution screen 1000, the migration progress and migration validation execution screen 1100, and the migration validation result screen 1200 are shown, the present invention is not limited to them as long as similar screen elements are included. For example, all of them may be shown on the same screen.

The embodiments of the present invention have been described specifically above, but the present invention is not limited to them, and may be variously modified without departing from the gist thereof.

The present embodiment makes it possible to perform favorable migration of data between clients in old and new PaaS environments by reproducing an old state in the old environment even in a case where a TX to be executed is linked to an external system.

At least the following are demonstrated by the above descriptions herein. Specifically, in the data migration method of the present embodiment, the data on the predetermined processing result which the distributed ledger node extracts from the transaction information obtained may be data from an external system or data on a result of executing particular processing.

According to this, data migration between clients in new and old PaaS environments can support not only a case where a TX to be executed is linked to an external system, but also a case where an execution result in a past state in its own system is written by a migration smart contract. Then, such writing enables the environment at the migration source to be reproduced in the new environment.

In addition, in the data migration method of the present embodiment, the management server may identify an organization to which a transaction issuer belongs based on an issuer ID indicated by the transaction information obtained, and transmit the migration transaction to the distributed ledger node if the organization to which the transaction issuer belongs is an organization to which the distributed ledger node belongs.

According to this, regarding a transaction issued by a different organization, data migration can be passed to the different organization instead of the reproduction being carried out in its own organization. Then, only a result of transaction execution is obtained from the different organization, which may improve overall processing efficiency. By extension, it is possible to achieve favorable migration of data between clients in old and new PaaS environments by reproducing an old state in the old environment even in a case where a TX to be executed is linked to an external system.

In addition, in the migration method of the present embodiment, the management server may retain, in a storage device, information on management servers in respective organizations that use blockchain platforms, and the method may further comprise, if the organization identified is a different organization from the organization to which the distributed ledger node belongs, causing the management server to perform processing to refer to the storage device for information on the management server in the different organization and transmit a migration execution request to the management server in the different organization, the request including the transaction information obtained, and processing to obtain a result of the migration transaction executed by a distributed ledger node in the different organization from the management server in the different organization.

According to this, regarding a transaction issued by a different organization, data migration can be passed to the different organization instead of the reproduction being carried out in its own organization. This may improve overall processing efficiency since a result of transaction execution is merely obtained from the different organization. By extension, it is possible to achieve favorable migration of data between clients in old and new PaaS environments by reproducing an old state in the old environment even in a case where a TX to be executed is linked to an external system.

In addition, the migration method of the present embodiment may further comprise causing the distributed ledger node to perform processing to identify an organization to which a transaction issuer belongs based on an issuer ID indicated by the transaction data obtained from the distributed ledger at the data migration source. Then, if the organization to which the transaction issuer belongs is an organization to which the distributed ledger node belongs, the distributed ledger node may execute the processing to extract data on a predetermined processing result from the transaction information obtained and execute a transaction based on the transaction information using the extracted data as an argument and the processing to transmit a result of the transaction executed to a transaction distribution node at the data migration destination.

According to this, the validation about the transaction issuing organization can be done not only on the management server side, but also on the distributed ledger node side, which leads to more accurate detection of wrongdoing such as tampering of transactions. By extension, it is possible to achieve favorable migration of data between clients in old and new PaaS environments by reproducing an old state in the old environment even in a case where a TX to be executed is linked to an external system.

In addition, the migration method of the present embodiment may further comprise causing the distributed ledger node to perform processing to identify an organization to which a transaction issuer belongs based on an issuer ID indicated by the transaction data obtained from the distributed ledger at the data migration source, and if the organization to which the transaction issuer belongs is an organization to which the distributed ledger node belongs, obtain information on a block from the distributed ledger in the blockchain platform at the data migration source based on the transaction ID, and processing to extract, from the block, information on a transaction executed in the blockchain platform at the data migration source before the transaction indicated by the transaction ID. The distributed ledger node may extract a transaction ID from the extracted information on the transaction, and if a transaction with the extracted transaction ID is stored in a distributed ledger in the blockchain platform at the data migration destination, execute the processing to extract data on a predetermined processing result from the transaction information obtained and execute a transaction based on the transaction using the data as an argument and the processing to transmit a result of the transaction executed to a transaction distribution node at the data migration destination.

According to this, the correctness of the order of transactions in a blockchain in the distributed ledger can also be validated. By extension, it is possible to achieve favorable migration of data between clients in old and new PaaS environments by reproducing an old state in the old environment even in a case where a TX to be executed is linked to an external system.

In addition, the migration method of the present embodiment may further comprise: causing the distributed ledger node to perform processing to obtain a transaction ID on a transaction which has been migrated from the data migration source and is included in a distributed ledger at the data migration destination, and obtain a block that includes the transaction ID from the distributed ledger at the data migration source, and processing to extract a transaction ID and data on a predetermined processing result from a transaction in the block obtained, and validate whether the transaction ID and the data on the predetermined processing result match the transaction ID and the data on the predetermined processing result in the distributed ledger at the data migration destination. If it is determined as a result of the validation that the transaction ID and the data on the predetermined processing result match between the data migration source and the data migration destination, the distributed ledger node may determine that data migration has succeeded.

According to this, it is possible to validate whether all the transactions migrated to the new environment are the same as and are written in the same order as those in the old environment. By extension, it is possible to achieve favorable migration of data between clients in old and new PaaS environments by reproducing an old state in the old environment even in a case where a TX to be executed is linked to an external system.

In addition, in the migration method of the present embodiment, the distributed ledger node may output at least one of a status of the validation and a result of the determination to a client node in the blockchain platform at the migration destination.

According to this, a user can clearly and easily know the status and result of data migration between the old and new blockchain platforms. By extension, it is possible to achieve favorable migration of data between clients in old and new PaaS environments by reproducing an old state in the old environment even in a case where a TX to be executed is linked to an external system.

What is claimed is:

1. A data migration method comprising:
by means of a management server configured to perform data migration between blockchain,
obtaining transaction information from a distributed ledger in a blockchain platform at a data migration source, and
transmitting a migration transaction to a distributed ledger node in a blockchain platform at a data migration destination, the migration transaction specifying a transaction ID indicated by the transaction information obtained;
the management server further configured to identify an organization to which a transaction issuer belongs based on an issuer ID indicated by the transaction information obtained, and transmit the migration transaction to the distributed ledger node if the organization to which the transaction issuer belongs is an organization to which the distributed ledger node belongs; and
by means of the distributed ledger node,
receiving the migration transaction and obtaining transaction information in the distributed ledger at the data migration source based on the transaction ID,
extracting data on a predetermined processing result from the transaction information obtained and executing a transaction which is based on the transaction information using the extracted data as an argument, and
transmitting a result of the transaction executed to a transaction distribution node at the data migration destination.

2. The data migration method according to claim 1, wherein
the data on the predetermined processing result which the distributed ledger node extracts from the transaction information obtained is data from an external system or data on a result of executing particular processing.

3. The data migration method according to claim 1, wherein the management server is configured to retain, in a storage device, information on management servers in respective organizations that use blockchain platforms, and if the organization identified is a different organization from the organization to which the distributed ledger node belongs, the method further comprises, by means of the management server, referring to the storage device for information on the management server in the different organization and transmit a migration execution request to the management server in the different organization, the migration execution request including the transaction information obtained, and obtaining a result of the migration transaction executed by a distributed ledger node in the different organization from the management server in the different organization.

4. The data migration method according to claim 1, further comprising, by means of the distributed ledger node, identifying an organization to which a transaction issuer belongs based on an issuer ID indicated by the transaction information obtained from the distributed ledger at the data migration source, wherein if the organization to which the transaction issuer belongs is an organization to which the distributed ledger node belongs, the distributed ledger node extracts data on a predetermined processing result from the transaction information obtained and executes a transaction based on the transaction information using the extracted data as an argument and transmits a result of the transaction executed to a transaction distribution node at the data migration destination.

5. The data migration method according to claim 1, further comprising, by means of the distributed ledger node, identifying an organization to which a transaction issuer belongs based on an issuer ID indicated by the transaction data obtained from the distributed ledger at the data migration source, and if the organization to which the transaction issuer belongs is an organization to which the distributed ledger node belongs, obtaining information on a block from the distributed ledger in the blockchain platform at the data migration source based on the transaction ID, and extracting, from the block, information on a transaction executed in the blockchain platform at the data migration source before the transaction indicated by the transaction ID, wherein the distributed ledger node extracts a transaction ID from the extracted information on the transaction, and if a transaction with the extracted transaction ID is stored in a distributed ledger in the blockchain platform at the data migration destination, extracts data on a predetermined processing result from the transaction information obtained and execute a transaction based on the transaction information using the data as an argument and transmits a result of the transaction executed to a transaction distribution node at the data migration destination.

6. The data migration method according to claim 1, further comprising:

by means of the distributed ledger, obtaining a transaction ID on a transaction which has been migrated from the data migration source and is included in a distributed ledger at the data migration destination, and obtaining a block that includes the transaction ID from the distributed ledger at the data migration source, and extracting a transaction ID and data on a predetermined processing result from a transaction in the block obtained, and validating whether the transaction ID and the data on the predetermined processing result match the transaction ID and the data on the predetermined processing result in the distributed ledger at the data migration destination, wherein if it is determined as a result of the validation that the transaction ID and the data on the predetermined processing result match between the data migration source and the data migration destination, the distributed ledger node determines that data migration has succeeded.

7. The data migration method according to claim 6, wherein the distributed ledger node outputs at least one of a status of the validation and a result of the determination to a client node in the blockchain platform at the migration destination.

8. A data migration system comprising:

a management server configured to perform data migration between blockchain platforms and includes a communication device that communicates with devices in the blockchain platforms via a network, and an arithmetic device configured to obtain transaction information from a distributed ledger in the blockchain platform at a data migration source, and transmits a migration transaction to a distributed ledger node in the blockchain platform at a data migration destination, the migration transaction specifying a transaction ID indicated by the transaction information obtained;

the management server is further configured to identify an organization to which a transaction issuer belongs based on an issuer ID indicated by the transaction information obtained, and transmit the migration transaction to the distributed ledger node if the organization to which the transaction issuer belongs is an organization to which the distributed ledger node belongs;

and the distributed ledger node that includes a communication device that communicates with the devices in the blockchain platforms, a storage device that retains a distributed ledger, and an arithmetic device configured to receive the migration transaction from the management server, obtain transaction information in the distributed ledger at the data migration source based on the transaction ID, extract data on a predetermined processing result from the transaction information obtained, execute a transaction which is based on the transaction information using the extracted data as an argument, and transmit a result of the executed transaction to a transaction distribution node at the data migration destination.

9. A node comprising:

a communication device that communicates with devices in blockchain platforms;

a storage device that retains a distributed ledger;

an arithmetic device configured to receive a migration transaction transmitted from a management server performing data migration between the blockchain platforms, obtain transaction information in a distributed ledger at a data migration source based on a transaction ID which is indicated by the migration transaction and obtained from the distributed ledger in the blockchain platform at the data migration source, extract data on a predetermined processing result from the transaction information obtained, execute a transaction which is based on the transaction information using the extracted data as an argument, and transmit a result of the executed transaction to a transaction distribution node at a data migration destinations; and a management server configured to identify an organization to which a transaction issuer belongs based on an issuer ID indicated by the transaction information obtained, and transmit the migration transaction to a distributed ledger node if the organization to which the transaction issuer belongs is an organization to which the distributed ledger node belongs.

\* \* \* \* \*